(12) United States Patent
Tristan et al.

(10) Patent No.: US 11,948,102 B2
(45) Date of Patent: Apr. 2, 2024

(54) CONTROL SYSTEM FOR LEARNING TO RANK FAIRNESS

(71) Applicant: Oracle International Corporation, Redwood City, CA (US)

(72) Inventors: Jean-Baptiste Frederic George Tristan, Burlington, MA (US); Michael Louis Wick, Burlington, MA (US); Swetasudha Panda, Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 17/819,611

(22) Filed: Aug. 12, 2022

(65) Prior Publication Data

US 2022/0382768 A1 Dec. 1, 2022

Related U.S. Application Data

(63) Continuation of application No. 16/781,961, filed on Feb. 4, 2020, now Pat. No. 11,416,500.

(Continued)

(51) Int. Cl.
*G06F 16/2457* (2019.01)
*G02B 27/01* (2006.01)
(Continued)

(52) U.S. Cl.
CPC ......... *G06Q 10/04* (2013.01); *G02B 27/0101* (2013.01); *G02B 27/0172* (2013.01); *G06F 16/24578* (2019.01); *G06F 17/18* (2013.01); *G06F 18/2113* (2023.01); *G06F 18/2193* (2023.01); *G06N 20/00* (2019.01); *G06N 20/20* (2019.01); *G06T 19/006* (2013.01); *G06V 20/20* (2022.01); *G09G 3/003* (2013.01);
(Continued)

(58) Field of Classification Search
CPC .. G06F 16/24578; G06N 20/00; G06N 5/022; G06N 5/025
See application file for complete search history.

(56) References Cited

U.S. PATENT DOCUMENTS 7,720,720 B1    5/2010   Sharma et al.
11,416,500 B2   8/2022   Tristan et al.
(Continued)

FOREIGN PATENT DOCUMENTS

WO    2020146028 A1    7/2020

OTHER PUBLICATIONS

Cynthia Dwork, et al., "Fairness Through Awareness", arXiv:1104.3913v2, Nov. 29, 2011, pp. 1-24.
(Continued)

*Primary Examiner* — Hau H Hoang
(74) *Attorney, Agent, or Firm* — Robert C. Kowert; Kowert, Hood, Munyon, Rankin & Goetzel, P.C.

(57) ABSTRACT

A Bayesian test of demographic parity for learning to rank may be applied to determine ranking modifications. A fairness control system receiving a ranking of items may apply Bayes factors to determine a likelihood of bias for the ranking. These Bayes factors may include a factor for determining bias in each item and a factor for determining bias in the ranking of the items. An indicator of bias may be generated using the applied Bayes factors and the fairness control system may modify the ranking if the determines likelihood of bias satisfies modification criteria for the ranking.

20 Claims, 20 Drawing Sheets

Related U.S. Application Data

(60) Provisional application No. 62/851,475, filed on May 22, 2019.

(51) Int. Cl.

| | | |
|---|---|---|
| *G06F 17/18* | (2006.01) | |
| *G06F 18/21* | (2023.01) | |
| *G06F 18/2113* | (2023.01) | |
| *G06N 20/00* | (2019.01) | |
| *G06N 20/20* | (2019.01) | |
| *G06Q 10/04* | (2023.01) | |
| *G06T 19/00* | (2011.01) | |
| *G06V 20/20* | (2022.01) | |
| *G09G 3/00* | (2006.01) | |

(52) U.S. Cl.
CPC .................. *G02B 2027/0118* (2013.01); *G02B 2027/0138* (2013.01); *G02B 2027/014* (2013.01); *G09G 2320/0626* (2013.01)

(56) References Cited

U.S. PATENT DOCUMENTS

| | | |
|---|---|---|
| 2013/0086082 A1 | 4/2013 | Park et al. |
| 2017/0206504 A1 | 7/2017 | Taylor |
| 2018/0101885 A1 | 4/2018 | Abhishek |
| 2020/0167512 A1 | 5/2020 | Chitra |
| 2020/0293951 A1 | 9/2020 | Johnston et al. |
| 2020/0372290 A1 | 11/2020 | Tristan et al. |
| 2020/0372406 A1 | 11/2020 | Wick et al. |
| 2020/0372435 A1 | 11/2020 | Kenthapadi et al. |
| 2020/0372472 A1 | 11/2020 | Kenthapadi |
| 2021/0049503 A1 | 2/2021 | Nourian et al. |
| 2021/0374582 A1 | 12/2021 | Tristan et al. |
| 2022/0036203 A1 | 2/2022 | Nachum et al. |
| 2022/0156646 A1 | 5/2022 | Farrar et al. |

OTHER PUBLICATIONS

Cynthia Rudin, et al., "The Age of Secrecy and Unfairness in Recidivism Prediction", Harvard Data Science Review 2.1, Published on Jan. 31, 2020, Updated on Mar. 31, 2020, pp. 1-55.
Muhammad Bilal Zafar, et al., "Fairness Constraints: Mechanisms for Fair Classification", arXiv:1507.05259v5, Mar. 23, 2017, In Proceedings of the 20th International Conference on Artificial Intelligence and Statistics (AISTATS) 2017, pp. 1-12.
Benjamin Fish, et al., "A Confidence-Based Approach for Balancing Fairness and Accuracy", arXiv:1601.05764v1, Jan. 21, 2016, pp. 1-10.
Jon Kleinberg, et al., "Inherent Trade-Offs in the Fair Determination of Risk Scores", arXiv:1609.05807v2, Nov. 17, 2016, pp. 1-23.
Sorelle A. Friedler, et al., "On the (im)possiblity of fairness", arXiv:1609.07236v1, Sep. 23, 2016, pp. 1-16.
Alexandra Chouldechova, "Fair prediction with disparate impact: A study of bias in recidivism prediction instruments", arXiv:1610.07524v1, Oct. 24, 2016, pp. 1-6.
Muhammad Bilal Zafar, et al., Fairness Beyond Disparate Treatment & Disparate Impact: Learning Classification without Disparate Mistreatment:, arXiv:1610.08452v2, Mar. 8, 2017, pp. 1-10.
Sam Corbett-Davies, et al., "Algorithmic decision making and the cost of fairness", arXiv:1701.08230v4, Jun. 10, 2017, pp. 1-10.
Richard Berk, et al., "A Convex Framework for Fair Regression", arXiv:1706.02409v1, Jun. 7, 2017, pp. 1-15.
Maria-Florina Balcan, et al., "An Augmented PAC Model for Semi-Supervised Learning", 2006, pp. 61-89.
Aditya Krishna Menon, et al., "The Cost of Fairness in Binary Classification", Proceedings of Machine Learning Research 81, 2018, Conference of Fairness, Accountability, and Transparency, pp. 1-12.
Kuerui Wang, et al., "Topics over Time: A Non-Markov Continuous-Time Model of Topical Trends", KDD'06, Aug. 20-23, 2006, ACM, pp. 1-10.
Flavio Chierichetti et al., "Fair Clustering Through Fairlets" (31st Conference on Neural Information Processing Systems), dated 2017, pp. 1-9.
Hoda Heidari et al., "Fairness Behind a Veil of Ignorance: A Welfare Analysis for Automated Decision Making", (32nd Conference on Neural Information Processing Systems), dated 2018, pp. 1-12.
Toon Calders et al., "Three naive Bayes approaches for discrimination-free classification", dated 2010, pp. 277-292.
Cynthia Dwork et al., "Decoupled Classifiers for Group-Fair and Efficient Machine Learning", dated 2018, pp. 1-15.
Faisal Kamiran et al., "Data preprocessing techniques for classification without discrimination", dated Dec. 3, 2011, pp. 1-33.
Ehsan Kazemi et al., "Data Summarization with Privacy and Fairness Constraints", (Proceedings of the 35th International Conference on Machine Learning), dated 2018, pp. 1-10.
Junpei Komiyama et al., "Nonconvex Optimization for Regression with Fairness Constraints", (Proceedings of the 35th International Conference on Machine Learning), dated 2018, pp. 1-10.
Samira Samadi et al., "The Price of Fair PCS: One Extra Dimension", dated Oct. 31, 2018, pp. 1-19.
Michael Feldman et al., "Certifying and removing disparate impact", dated Jul. 16, 2015, pp. 1-28.
Matthew Joseph et al., "Fairness in Learning: Classic and Contextual Bandits", Nov. 7, 2016, pp. 1-28.
Thorsten Joachims et al., "Unbiased Learning-to-Rank with Biased Feedback", Aug. 16, 2016, pp. 1-10.
Hardt et al., "Equality of Opportunity in Supervised Learning", Oct. 7, 2016, pp. 1-22.
Ke Yang et al., "Measuring Fairness in Ranked Outputs", Oct. 26, 2016, pp. 1-5.
Shahin Jabbari et al., "Fairness in Reinforcement Learning", Aug. 6, 2017, pp. 1-23.
Elisa et al., "Ranking with Fairness Constraints", Jul. 30, 2018, pp. 1-32.
Sampath Kannan et al., "Fairness Incentives for Myopic Agents", May 5, 2017, pp. 1-23.
Meike Zehlike et al., "FA*IR: A Fair Top-k Ranking Algorithm", Jul. 2, 2018, pp. 1-10.
Danielle Ensign et al., "Runaway Feedback Loops in Predictive Policing", Dec. 22, 2017, pp. 1-12.
Muhammad Bilal Zafar et al., "From Parity to Preference-based Notions of Fairness in Classification", Nov. 28, 2017, pp. 1-14.
Amanda Bower et al., "Fair Pipelines", Jul. 3, 2017, pp. 1-5.
Cynthia Dwork et al., "Decoupled classifiers for fair and efficient machine learning", Jul. 20, 2017, pp. 1-20.
Michael Kearns et al., "Preventing Fairness Gerrymandering: Auditing and Learning for Subgroup Fairness", Dec. 3, 2018, pp. 1-34.
David Madras et al., "Predict Responsibly: Improving Fairness and Accuracy by Learning to Defer", Sep. 7, 2018, pp. 1-20.
Ursula Hebert-Johnson et al., "Calibration for the (Computationally-Identifiable) Masses", Mar. 16, 2018, pp. 1-40.
Abolfazl Asudeh et al., "Designing Fair Ranking Schemes", Jan. 4, 2018, pp. 1-16.
Elisa Celis et al., "Fair and Diverse DPP-based Data Summarization" Feb. 12, 2018, pp. 1-25.
Stephen Gillen et al., "Online Learning with an Unknown Fairness Metric", Sep. 18, 2018, pp. 1-27.
Ashudeep Singh et al., "Fairness of Exposure in Rankings", Oct. 17, 2018, pp. 1-10.
Michele Donini et al., "Empirical Risk Minimization Under Fairness Constraints", Jan. 31, 2020, pp. 1-17.
Alekh Agarwal et al., "A Reductions Approach to Fair Classification", Jul. 16, 2018, pp. 1-18.
Michael P. Kim et al., "Fairness Through Computationally-Bounded Awareness", Nov. 28, 2018, pp. 1-19.
Guy N. Rothblum et al., "Probably Approximately Metric-Fair Learning", Jul. 1, 2018, pp. 1-40.
Asia J. Biega et al., "Equity of Attention: Amortizing Individual Fairness in Rankings", May 4, 2018, pp. 1-10.
Meike Zehlike et al., "Reducing Disparate Exposure in Ranking: A Learning to Rank Approach", May 27, 2020, pp. 1-7.

(56) References Cited

OTHER PUBLICATIONS

Isabel Valera et al., "Enhancing the Accuracy and Fairness of Human Decision Making", May 25, 2018, pp. 1-11.
Nathan Kallus et al., "Residual Unfairness in Fair Machine Learning from Prejudiced Data", Jun. 7, 2018, pp. 1-14.
Niki Kilbertus et al., "Blind Justice: Fairness with Encrypted Sensitive Attributes", Jun. 8, 2018, pp. 1-15.
Marin, et al., "Importance sampling methods for Bayesian discrimination between embedded models," Oct. 2009, https://arxiv.org/pdf/0910.2325.pdf, pp. 1-16.
Perrakis, et al., "On the use of marginal posteriors in marginal likelihood estimation via importance sampling," Sep. 2014, https://www.sciencedirect.com/science/article/pii/S0167947314000814, pp. 54-69.
Mullachery, et al., "Bayesian Neural Networks," Jan. 2018, https://arxiv.org/ftp/arxiv/papers/1801/1801.07710.pdf, pp. 1-16.
Kamalov, "Kermel density estimation based sampling for imbalanced class distribution," Feb. 2000, https://www.sciencedirect.com/science/article/pii/S0020025519309740, pp. 1192-1201.
Boring, et al., "Student evaluations of teaching (mostly) do not measure teaching effectiveness, " 2016, ScienceOpen Research, 2016, pp. 1-11.
Goenner, "Discrimination and Mortgage Lending in Boston: The Effects of Model Uncertainty," 2010, The Journal of Real Estate Finance and Economics, vol. 40, pp. 260-285, 2010.
Radivojac, et al., "Feature Selection Filters based on the Permutation Test," Springer-Verlag Berlin Heidelberg 2004, European Conference on Machine Learning, pp. 334-346.
Geyik, et al., "Fairness—Aware Ranking in Serch & Recommendation Systems with Application to LinkedIn Talent Search", May 21, 2019, arXiv: v1905.01989v2, pp. 1-11, 2019.
Rouder, et al., "Bayesian t tests for accepting and rejecting the null hypothesis," 2019, Psychonomic Bulleting & Review, vol. 15(2), pp. 225-237.
N. Friel, et al., "Estimating the model evidence: a review", arXiv:1111.1957v1, Nov. 2011, pp. 1-21.
A. Mootoovaloo, et al., "Bayes Factors via Savage-Dickey Supermodels", arXiv:1609.02186v1, Sep. 7, 2016, pp. 1-24.
J. Mulder, et al., "A Generalization of the Savage-Dickey Density Ratio for Testing Equality and Order Constrained Hypotheses", arXiv:2004.09899v1, Apr. 21, 2020, pp. 1-15.
Andrew Gelman, et al., "Simulating Normalizing Constants: From Importance Sampling to Bridge Sampling to Path Sampling", Statistical Science 1998, vol. 13, No. 2, pp. 163-185.
Wikipedia, "Kernel density estimation", Retrieved from https://en.wikipedia.org/wiki/Kernel_density_estimation on, Jun. 19, 2020, pp. 1-13.
Matthew D. Hoffman, et al., "The No U-Turn Sampler: Adaptively Setting Path Lengths in Hamiltonian Monte Carlo", Journal of Machine Learning Research 15, 2014, pp. 1593-1623.
Michael G. Aamodt, et al., "Technical Advisory Committee Report on Best Practices in Adverse Impact Analyses", Published Sep. 2010, The Center for Corporate Equality, pp. 1-98.
Tatsunori B. Hashimoto et al., "Fairness Without Demographics in Repeated Loss Minimization", Jul. 30, 2018, pp. 1-18.
Sam Corbett-Davies et al., "The Measure and Mismeasure of Fairness: A Critical Review of Fair Machine Learning", Aug. 14, 2018, pp. 1-25.

CONTROL SYSTEM FOR LEARNING TO RANK FAIRNESS

PRIORITY INFORMATION

This application is a continuation of U.S. patent application Ser. No. 16/781,961, filed Feb. 4, 2020, which claims priority to U.S. Provisional Application Ser. No. 62/851,475, entitled "Bayesian Test of Demographic Parity for Learning to Rank," filed May 22, 2019, and which is incorporated herein by reference in its entirety.

BACKGROUND

Field of the Disclosure

This disclosure relates to detecting and mitigating bias and unfairness in items rankings.

Description of the Related Art

Machine learning systems are increasingly employed to improve decision making in business applications, but when machine learning systems participate in decision making in certain domains, such as credit or employment, there is a need to ensure that the system is free of bias, often according to rules and definitions set forth by regulatory bodies in those domains. In this context, bias often refers to some measure of discrepancy between the behavior of the machine learning system and mathematical rules established by these external regulatory bodies.

Machine learning models, however, are often developed using training data created with unintended biases. This manifests as bias in results when the models are applied. While future machine learning models may be developed that avoid these unintended biases, it is often the case that organizations responsible for ensuring fairness in results are separate from those that develop the machine learning models themselves. As a result, cooperation to implement necessary fairness constraints may be difficult or impossible. In such cases, ensuring fairness in results is an unresolved matter.

Figure 1:
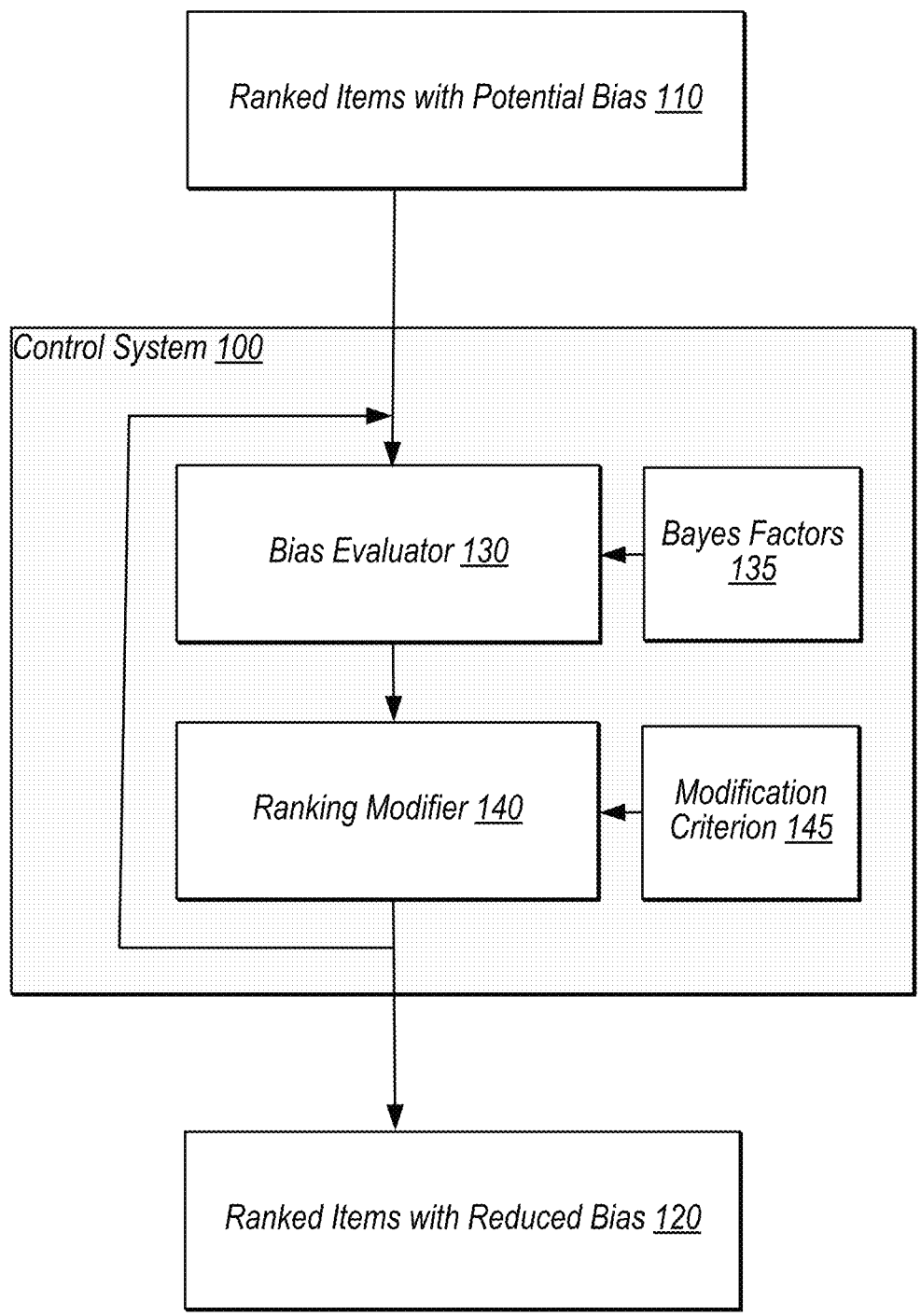
FIG. 1 is a block diagram of an exemplary control system for enforcing fairness in ranked items, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

A reference herein to a patent document or any other matter identified as prior art, is not to be taken as an admission that the document or other matter was known or that the information it contains was part of the common general knowledge as at the priority date of any of the claims.

DETAILED DESCRIPTION OF EMBODIMENTS

Various techniques for implementing a Bayesian test of demographic parity for learning to rank are described herein. The ability to detect and mitigate bias and unfairness is becoming increasingly important especially as machine learning continues to play an increasing role in business applications. In various embodiments, Bayes factors may be applied as a way of measuring fairness, as Bayes factors providing optimal handling of small sample sizes while providing a continuous measure over larger samples sizes. Thus, Bayes factors are suitable to form the basis of a control system that varies the aggressiveness of a post-processor in order to keep the overall system fair as the system continually operates on newly available data. Various analyses of Bayes factor algorithms on both real-world and synthetic ranking problems may be performed in order to understand their behavior. In some embodiments, Bayes factor algorithms may be better equipped to handle small data and able to operate in an environment in which the fairness of a collection of rankings can be understood.

In various embodiments, fairness, and bias, may not refer to a subjective concept but rather some objective measure of discrepancy between a behavior of a learning algorithm and some mathematical rule imposed by an external party with respect to a particular protected feature. In some embodiments, various tools tools may be employed to satisfy a fairness rule. For example, pre-processing methods could be applied to clean datasets, in-processing methods could be applied to train more fair classifiers, or post-processing could be applied to reduce the bias at test time. Each of these techniques may attempt to enforce some explicit or implicit property of fairness that might vary from component to component, and may align to various degrees with the fairness constraints actually imposed by the regulators and policy makers.

In various embodiments, a system may be implemented in the context of a ranking application (e.g., common to various business settings). One concrete example may be an employment application which may be referred to in various instances below, although similar techniques and would apply to any other ranking system whose output must comport with externally-imposed fairness rules in other embodiments. An example of a fairness rule, in some embodiments, is a variant of demographic parity, the four-fifths rule, which is widely used for employment related systems. The four-fifths rule states that if the selection rate of a particular demographic is less than four-fifths that of a majority demographic, then the selection rate may be biased and unfair. Other fairness rules could be used in other domains in other embodiments. In various embodiments, the ranking system may first select a subset of the input to be ranked and then rank such subset. For example, in a hiring application, the first phase could select the top 10 candidates and the second phase would rank them. Techniques described below may thus, in some embodiments, be decomposed into two stages, accordingly, where a first stage focuses on the four-fifths rule and a second stage focuses on ensuring that all permutations of the protected feature have the same probability.

Systems, as those described above, may need to handle small sample sizes optimally in order to be widely applicable. Consider for example the four-fifths rule, and consider, for example, the specific case of gender for the categories male and female. If there is one male and one female candidate and decision to hire one of them, the selection rate for one category will be 1 for one gender and 0 for the other, and the naive application of the four-fifths rule rejects a hiring decision which in itself cannot be construed as statistical evidence that the four-fifths rule is not met. In practice, such small data cases happen frequently and handling them optimally encourages the adoption of fairness methods.

In various embodiments, Bayes factors may be used to optimally handle small data cases, potentially providing a form of hypothesis testing that accounts for the inherent uncertainty in small data, to redefine tests in such a way that we account for the amount of evidence supporting some fairness property. Moreover, the Bayes factor may serve as a continuous measure of fairness that can drive aggressiveness of the post-processing control system in order to adapt to varying levels of unfairness encountered throughout the lifetime of the system. Application of such techniques on both real world and synthetic datasets demonstrate that the Bayes factor may provide a useful measure of fairness both for the purpose of testing and the control system itself.

In various embodiments, a system may implement a fairness control system or feature that monitors the output of a item ranker which generates outputs (e.g., which may be referred to as analyses). The fairness control system may employ some definition of fairness against which it monitors the output. If sufficient evidence for unfairness, or presence of bias, with respect to a protected feature is detected, appropriate action, i.e., modifying the output, may be taken by the system.

FIG. 1 is a block diagram of an exemplary control system for enforcing fairness in ranked items, according to some embodiments. The Control System 100 may include a Bias Evaluator 130 and Ranking Modifier 140 to apply evaluations of bias with respect to a protected feature to received Ranked Items with Potential Bias 110 to produce Ranked Items with Reduced Bias 120. The Ranked Items with Reduced Bias 120 may be generated in various embodiments of the Control System 100 as discussed further in FIG. 2 below.

Embodiments of the Control System 100 generating unbiased rankings of items may be useful in a wide variety of environments including, for example, business decision-making, consumer product recommendations, analytics, security, business an personal financial decisions, advertising, etc. Examples of applications incorporating these control systems may include human resources, credit authorization, financial transactions, public and private web-based services such as advertising and security and any number of other applications where fairness of decision-making is of importance where certain personal attributes such as race, age, gender or religion may in some contexts be considered protected classes.

To generate Ranked Items with Reduced Bias 120, the Control System 100 may include a Bias Evaluator 130 which employs one or more Bayes Factors 135, as discussed in FIG. 2B below. In some embodiments a plurality of bayes factors may be used. For example, the Bayes Factors 135 may include a first Bayes factor of a Bayesian hypothesis test which may be optimized for the four-fifths rule with respect to a protected feature and a second Bayes factor of a Bayesian hypothesis test which may be optimized for a permutation test with respect to a protected feature. Those skilled in the art will recognize that this example of Bayes factors is merely illustrative and not intended to be limiting and that various embodiments of the Bias Evaluator 130 may employ any number of Bayes Factors 135.

A Ranking Modifier 140 may receive a determination of a likelihood of bias with respect to a protected feature from the Bias Evaluator 130 and determine to modify the ranking of the items with respect to a protected feature based on a Modification Criterion 145. This modification may be performed in various embodiments of the Control System 100 as discussed further in FIG. 2D below. In some embodiments, should the ranking be modified, the process may be repeated. If the Modification Criterion 145 indicates that the ranking should not be modified or if the process is not to be further repeated, Ranked Items with Reduced Bias 120 may be output by the Control System 100.

The Control System 100 may receive Ranked Items with Potential Bias 110 from any number of sources in various embodiments. For example, ranked items with respect to a protected feature may be provided by a learning to rank (LTR) system. The implementation of such ranking systems may be unknown to the Control System 100. Furthermore, the Control System 100 may require evaluation of bias with respect to a protected feature with small sample sizes while providing a continuous measure of bias over larger samples sizes. Those skilled in the art will recognize that the Control System 100 does not require any particular source of ranked items and that the above example is merely illustrative and is not intended to be limiting.

Those skilled in the art will recognize that Control System 100 may in some embodiments be implemented using a single computing system such as shown in FIG. 10 below or using a distributed computing system including multiple computing systems as shown in FIG. 10. Other embodiments the Control System 100 may use different computing systems or distributed computing systems to implement some or all of the respective Bias Evaluator 130 and Ranking Modifier 140 components of the Control System 100 and that various means of communicating between the respective components may be employed including, for example, network interfaces, storage devices, user interface devices and application programming interfaces. In some embodiments, for example, first and second distributed computing systems may be employed to respectively implement the Bias Evaluator 130 and Ranking Modifier 140 components of the Control System 100. This example, however, is merely illustrative and is not intended to be limiting.

By employing Bayes factors in a control system for ranked items with respect to a protected feature, bias in the ranking of the items may be reduced or eliminated resulting in improved fairness, as is shown further in FIGS. 3-7 below.

Figure 2A:
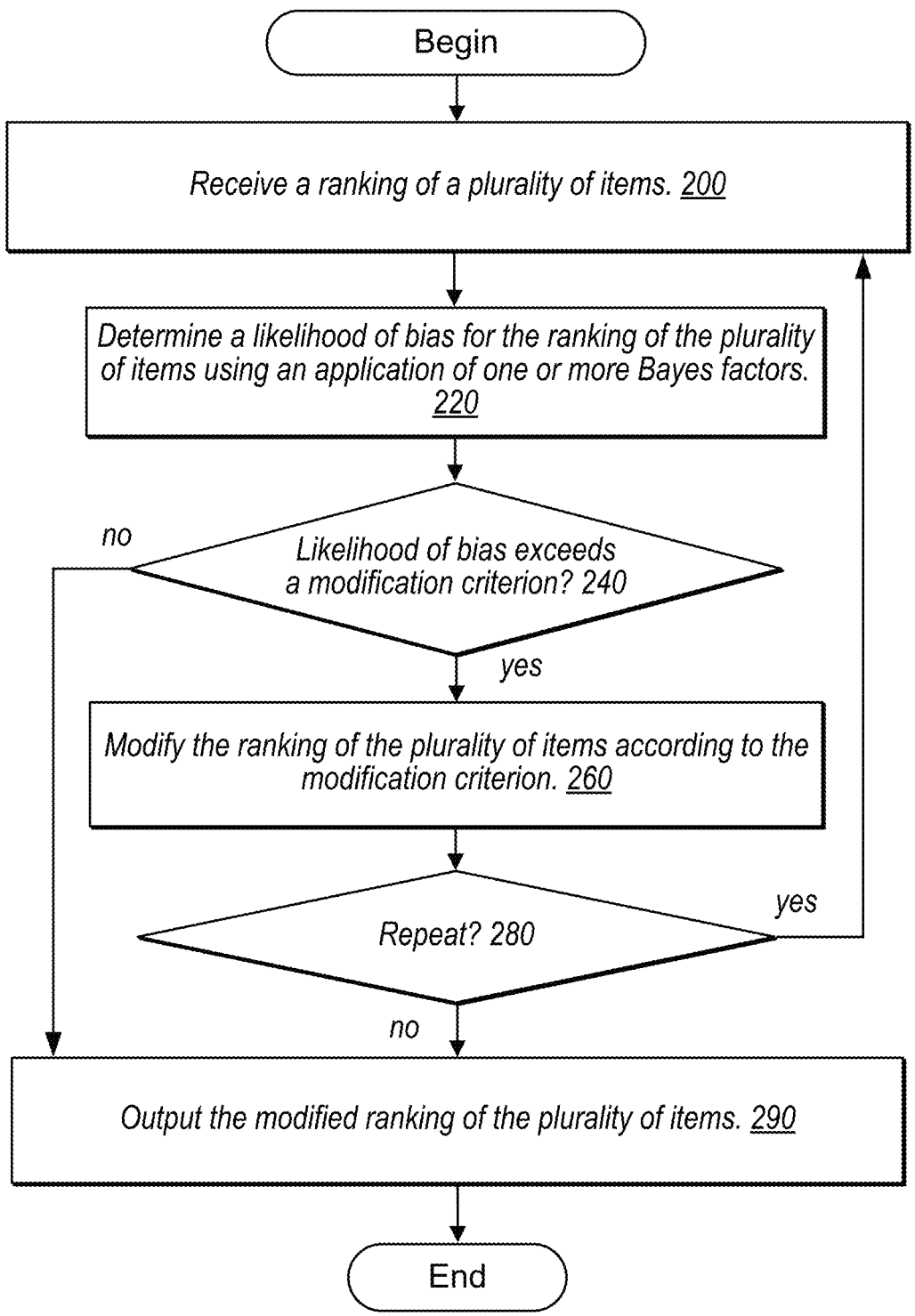
FIGS. 2A-2D are flow diagrams illustrating a process of reducing bias in a ranking of items, according to some embodiments.

FIG. 2A is a flow diagram illustrating a process of reducing bias in a ranking of items with respect to a protected feature, according to some embodiments. In some embodiments, a control system, such as the Control System 100, as discussed in connection with FIG. 1, may perform the below techniques. Systems such as data collection or aggregation systems, data stream processing systems, or other systems, services, or applications may generate a ranking of items in some embodiments to be received by the control system, as indicated at 200.

As indicated in 220, a likelihood of bias may be determined for the ranking of items by applying one or more Bayes factors. In some embodiments, a bias evaluator, such as the Bias Evaluator 130, as discussed in connection with FIG. 1, may perform this determination. The bias evaluator may employ one or more Bayes factors, such as the Bayes Factors 135 as discussed in connection with FIG. 1, to make the determination. Any number of Bayes factors may be used. For example, and as discussed in FIG. 2B below, the Bias Evaluator 130 may employ two Bayes factors in some embodiments. A first Bayes factor of a Bayesian hypothesis test may be optimized for the four-fifths rule with respect to a protected feature and a second Bayes factor of a Bayesian hypothesis test which may be optimized for a permutation test with respect to a protected feature. Those skilled in the art will recognize that this example of Bayes factors is merely illustrative and not intended to be limiting and that various embodiments of the Bias Evaluator 130 may employ any number of Bayes Factors 135.

As indicated in 240, the determined likelihood of bias with respect to a protected feature may be compared to a modification criterion. In some embodiments, the modification criterion, such as the Modification Criterion 145, as discussed in connection with FIG. 1, may be used. If the determined likelihood of bias exceeds the modification criterion, the process proceeds to step 260. Otherwise, the ranking of items may be output without modification as indicated in 290.

As indicated in 260, the ranking of items may be modified to reduce bias with respect to a protected feature according to the modification criterion. In some embodiments, a ranking modifier, such as the Ranking Modifier 140, as discussed in connection with FIG. 1, may perform this modification. This modification may be performed as described in FIG. 2D below. In some embodiments, once the ranking is modified, the ranking of items may be output as indicated in 290. In other embodiments, once the ranking is modified the process may repeat by providing the modified ranking of items as the received ranking of items as shown in 200. In some embodiments, the process may be repeated until a determined likelihood of bias does not exceed a modification criterion while in other embodiments the process may be repeated up to a predetermined number of iterations.

As indicated on 290, once a determined likelihood of bias does not exceed a modification criterion or it is determined that the process should not repeat, the ranking of items may be output.

Figure 2B:
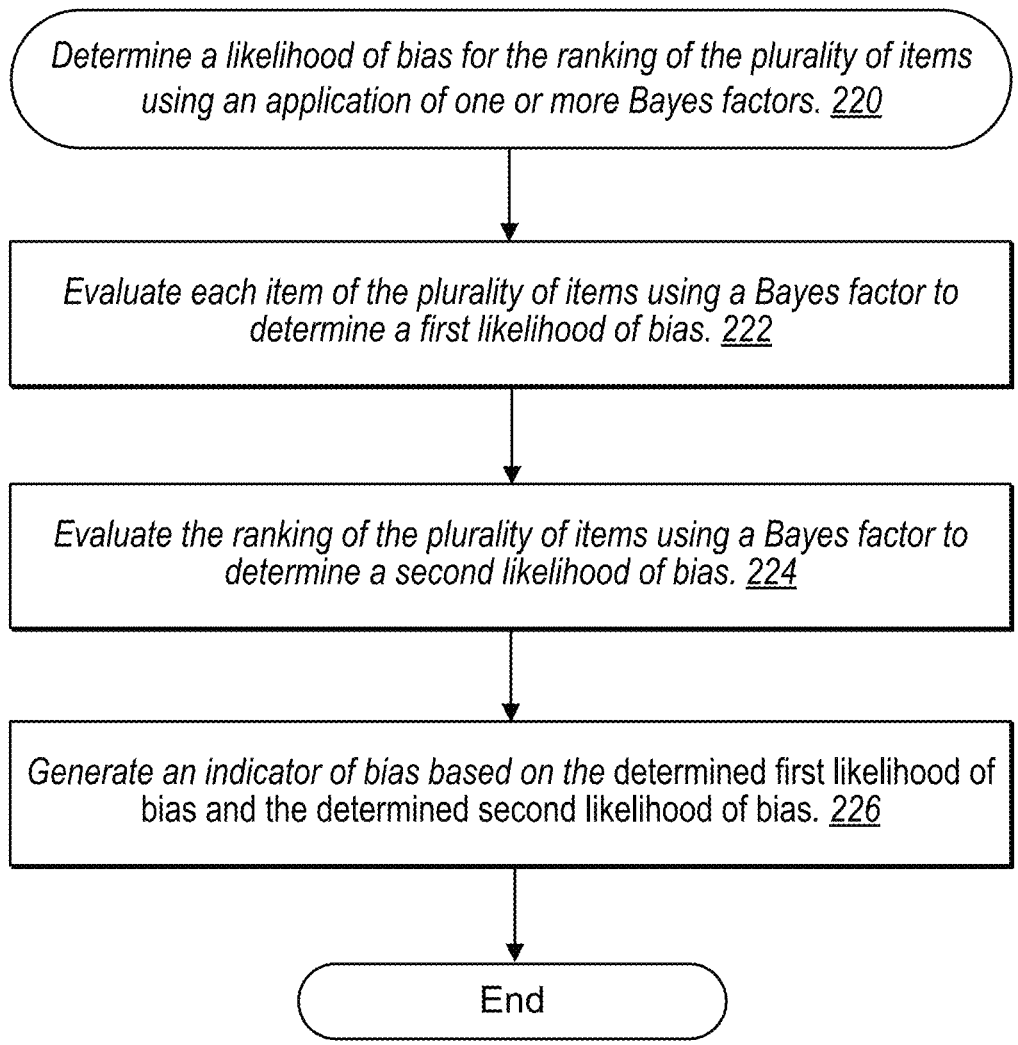

FIG. 2B is a flow diagram illustrating methods and techniques for determining a likelihood of bias with respect to a protected class, according to some embodiments. In some embodiments, a bias evaluator, such as the Bias Evaluator 130 of the Control System 100, as discussed in connection with FIG. 1, may perform the below techniques. In various embodiments, one or more Bayes factors, such as the Bayes Factors 135 as discussed in connection with FIG. 1, may be used in this determination. For example, in some embodiments, a two step approach for enforcing fairness with respect to a protected class may be used.

As indicated in 222, in a first step the Bayes factor of a Bayesian hypothesis test may be used to evaluate each item in the ranked list of items. This test may be optimized over the number of candidates from each protected group of a protected class in the ranked items. This first test may ensure that the selection process for which items appear in the ranking satisfies a requirement for demographic parity, in particular the four-fifths rule, with respect to a protected class. This evaluation of each item may determine a first likelihood if bias for the ranking of items.

As indicated in 224, in a second step the Bayes factor of a Bayesian hypothesis test may be optimized for a permutation test to be applied to the overall ranking of the items with respect to a protected class. For example in some embodiments considering gender as the protected class, $r_i$=[M, M, M, F] may be re-ranked as [M, M, F, F] where M and F represent male and female genders, respectfully. The latter optimization is done over the probability simplex of permutations in order to make a randomized choice of ranking which provides some privacy as to how fairness, or absence of bias, is enforced. Again as an example, $r_i$= [M, M, F] may be re-ranked as [F, M, M]. The second test may ensure that the set rankings represent all the permutations of a protected feature. This evaluation of the ranking of items may determine a second likelihood if bias for the ranking of items.

Figure 2C:
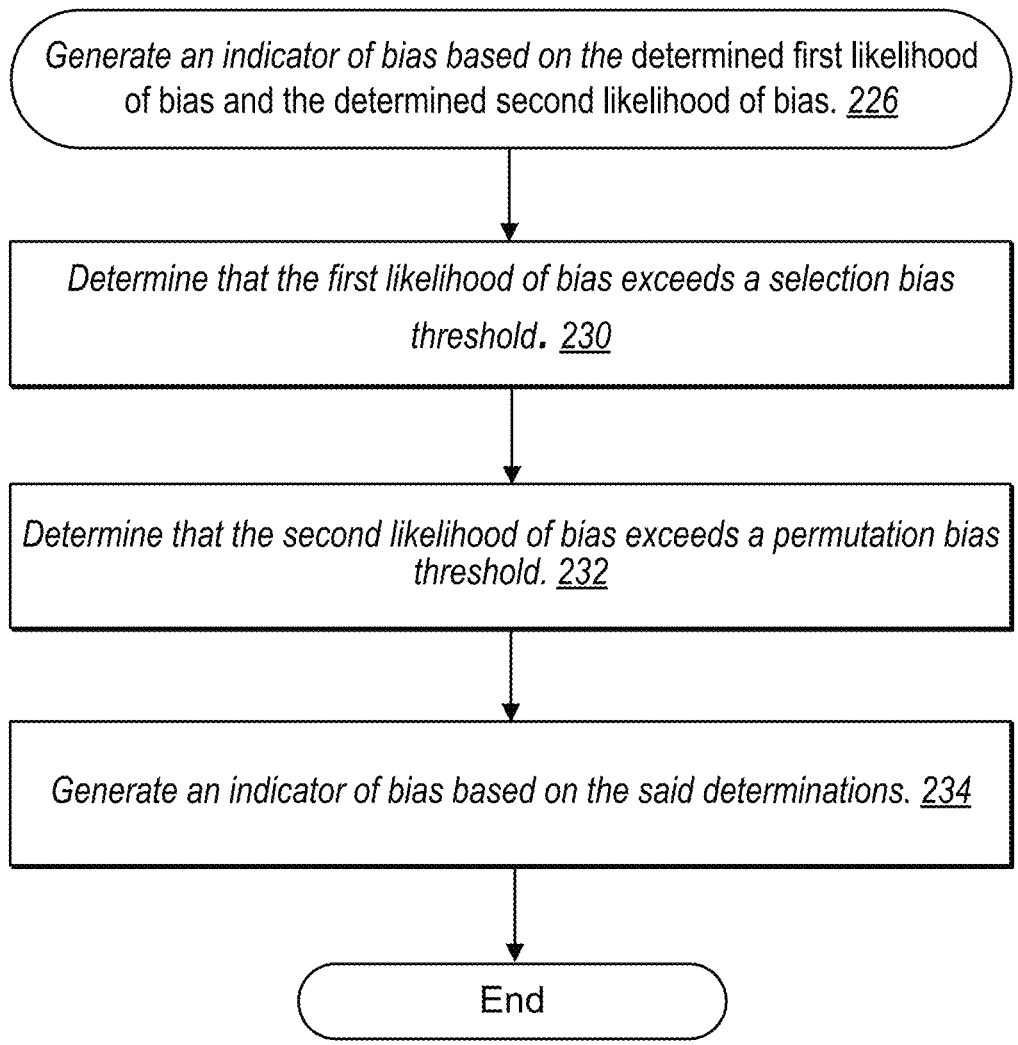

As indicated in 226, and indicator of bias may be generated based on the first and second likelihoods if bias by the bias evaluator of the control system, as shown in FIG. 2C. As indicated in 230, a determination may be made that the first likelihood if bias exceeds a selection bias threshold. In some embodiments, this selection bias threshold may, for example, be determined by the four-fifths rule with respect to a protected class. If, in some embodiments, the four-fifths rule is satisfied with respect to a protected class for each of the items in the ranking, then it is determined that the first likelihood of bias does not exceed a selection bias threshold. Likewise, if four-fifths rule is not satisfied with respect to a protected class for any of the items in the ranking, then it is determined that the first likelihood of bias does exceed a selection bias threshold.

As indicated in 232, a determination may be made that the second likelihood if bias exceeds a permutation bias threshold. In some embodiments, this permutation bias threshold may, for example, be a threshold for which some permutations are much more likely than others. If, in some embodiments, some permutations are more likely than other permutations above a permutation threshold, then it is determined that the second likelihood of bias does exceed a permutation bias threshold. Likewise, if some permutations are not more likely than other permutations according to a permutation threshold, then it is determined that the second likelihood of bias does not exceed a selection bias threshold.

In some embodiments, the indicator of bias may indicate bias if either the first or the second likelihoods of bias are indicative of bias. Once the indicator of bias is generated, the process is complete.

Figure 2D:
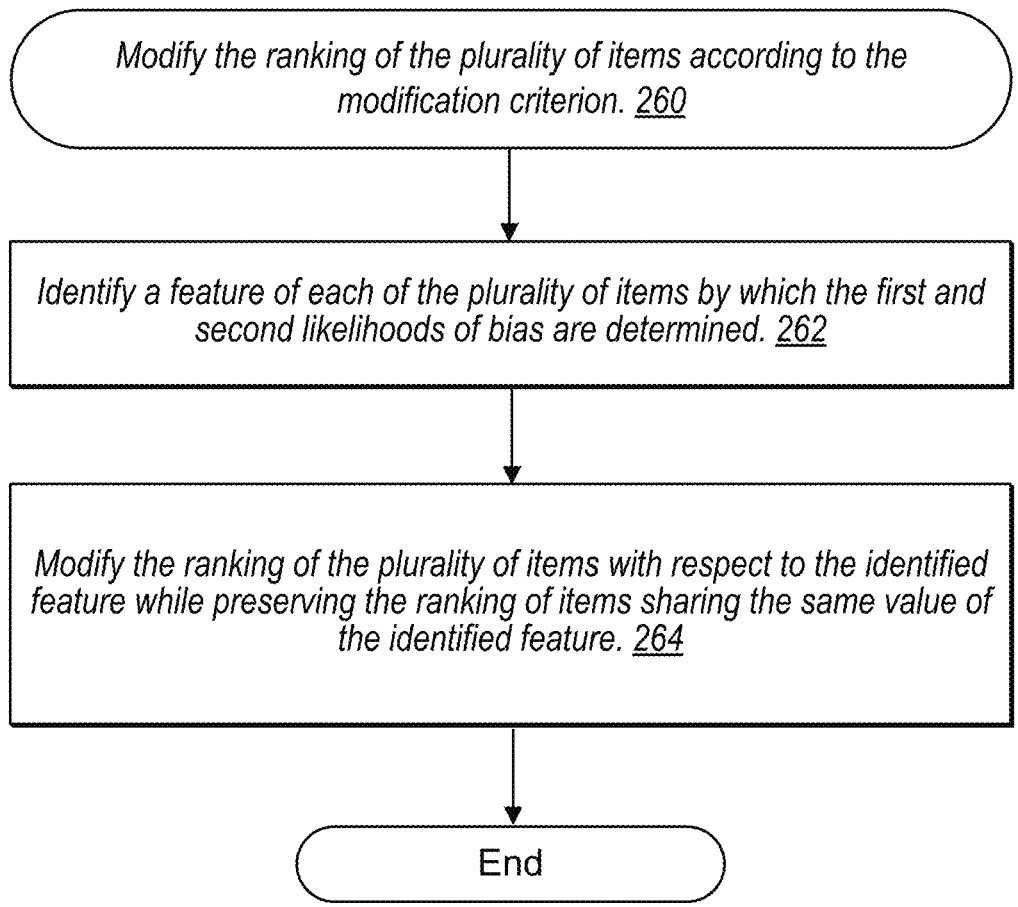
Figure 3A:
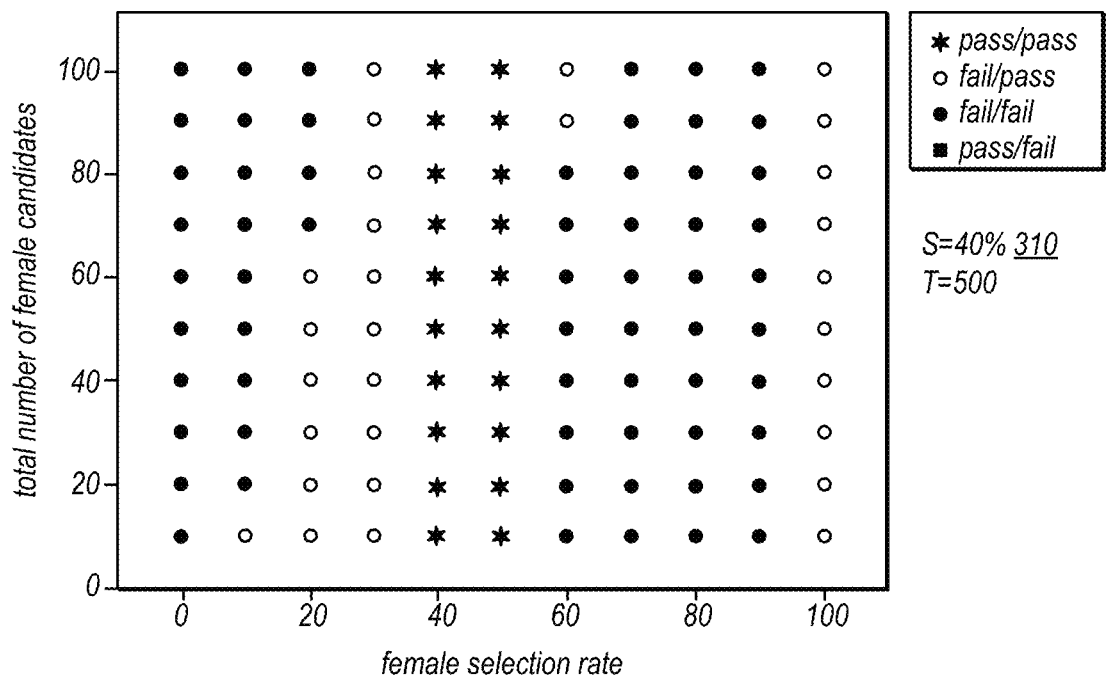
FIG. 3A-3D illustrate example analyses of the application of Bayes factors to test for fairness in a selection process, in some embodiments.
Figure 3B:
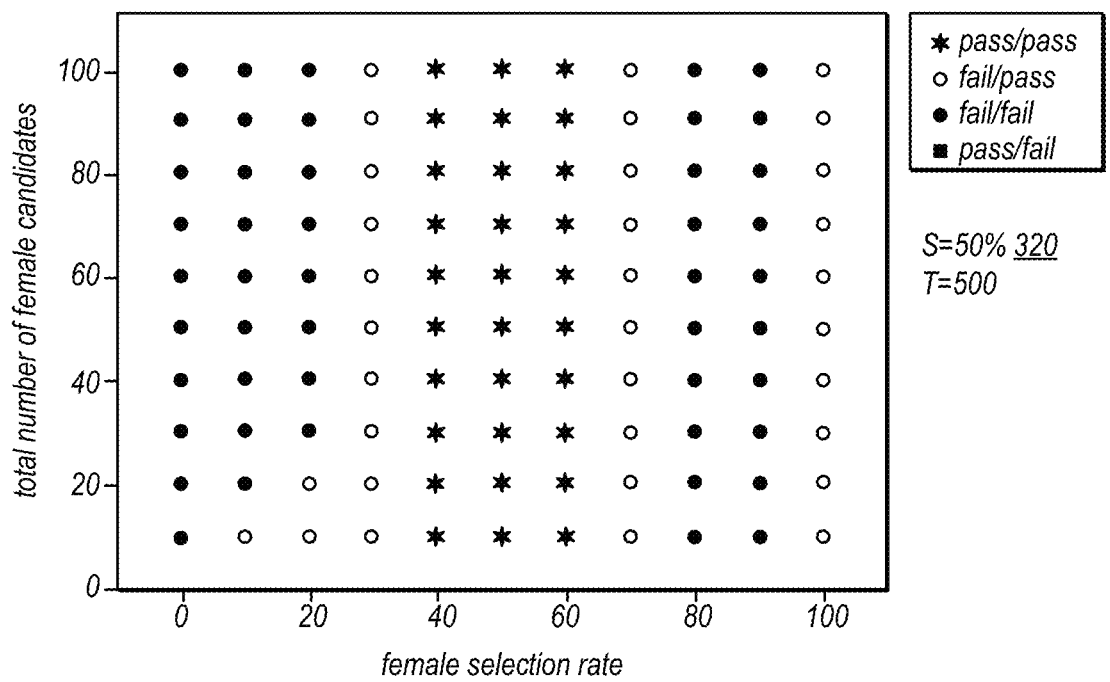
Figure 3C:
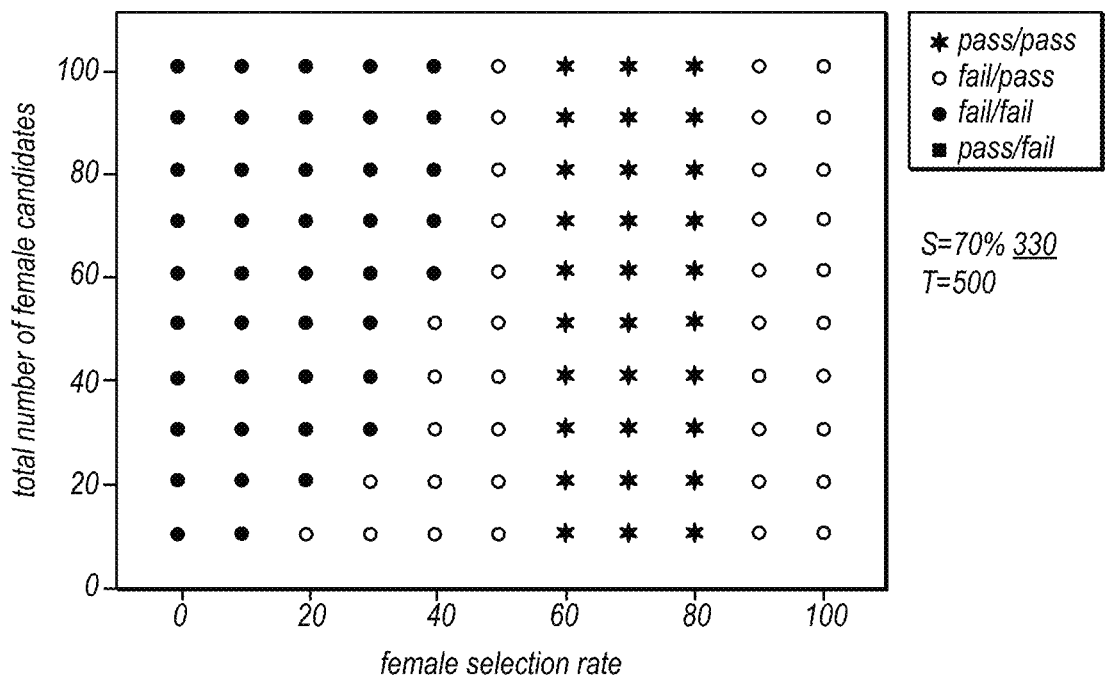
Figure 3D:
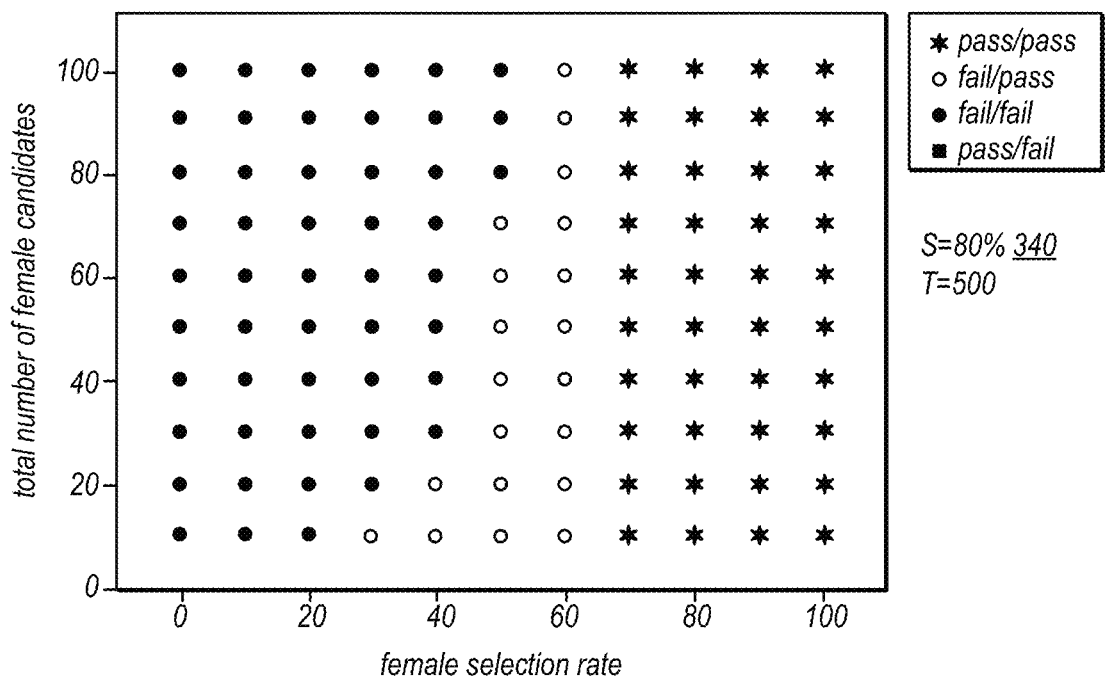
Figure 4A:
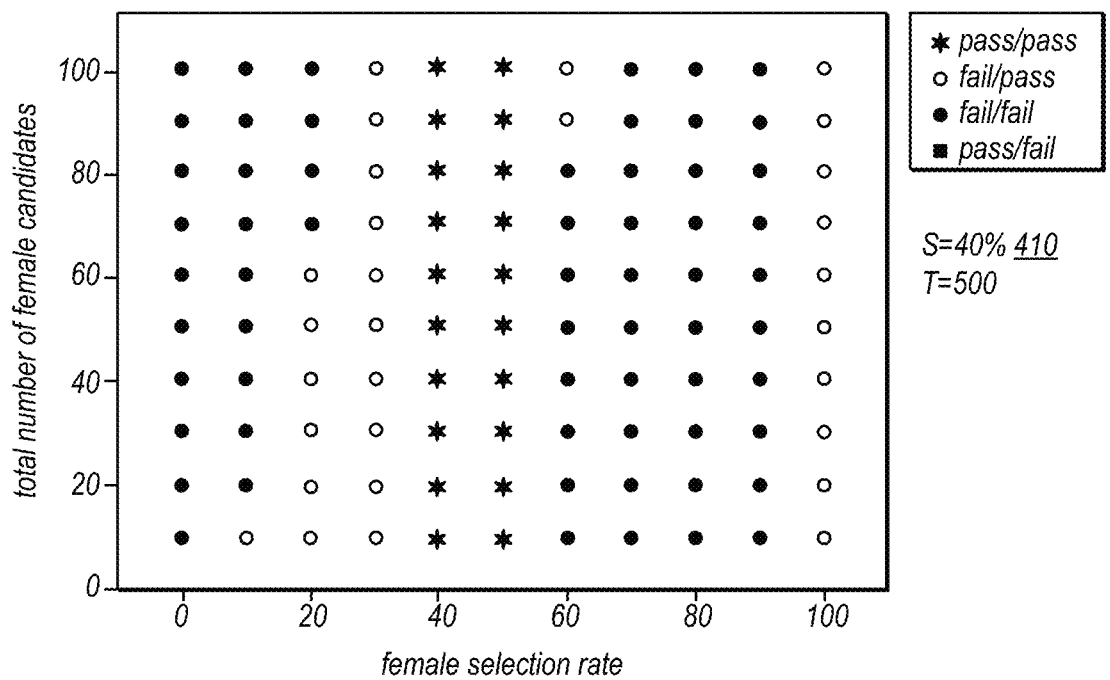
FIG. 4A-4D illustrate example analyses of the application of Bayes factors to test for fairness in a selection process, in some embodiments.
Figure 4B:
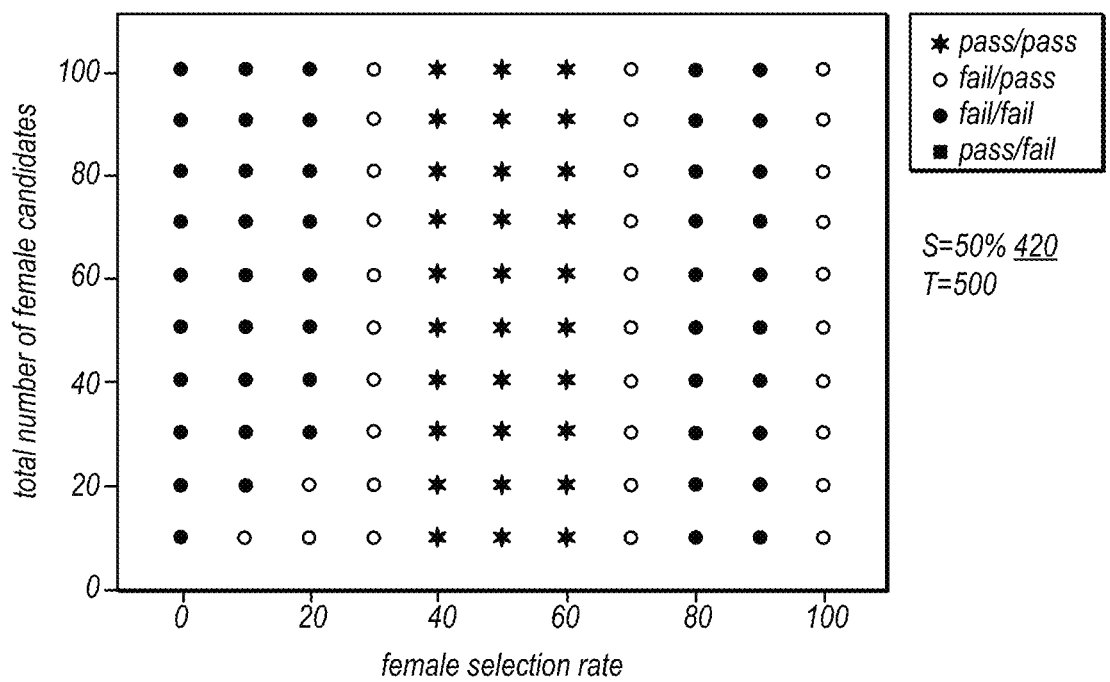
Figure 4C:
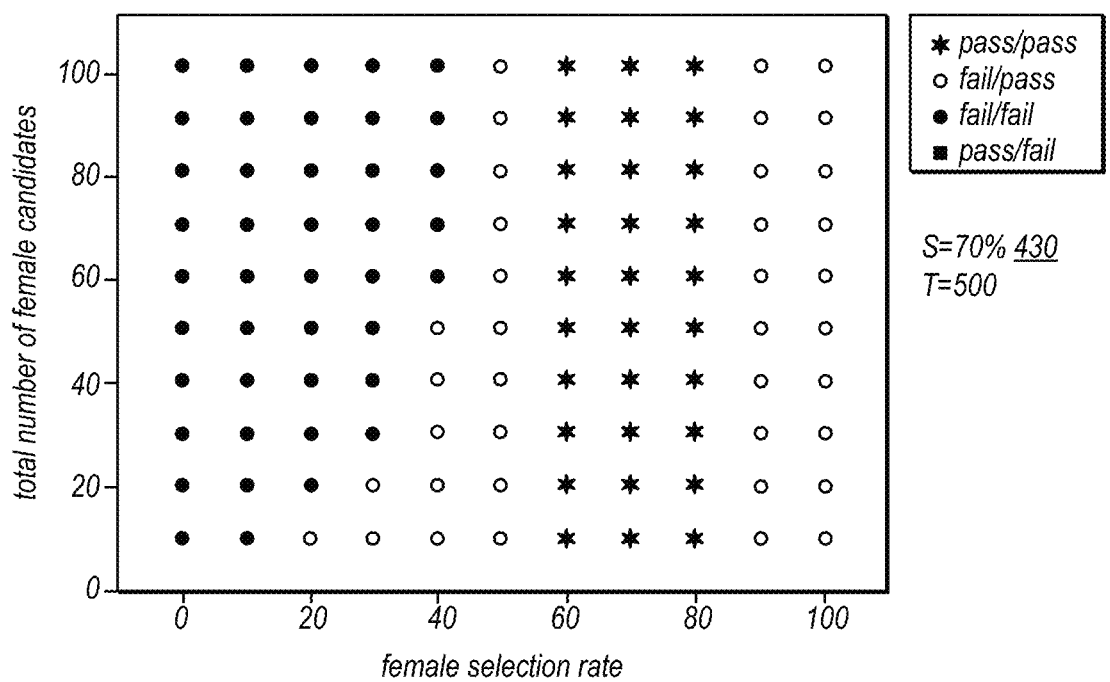
Figure 4D:
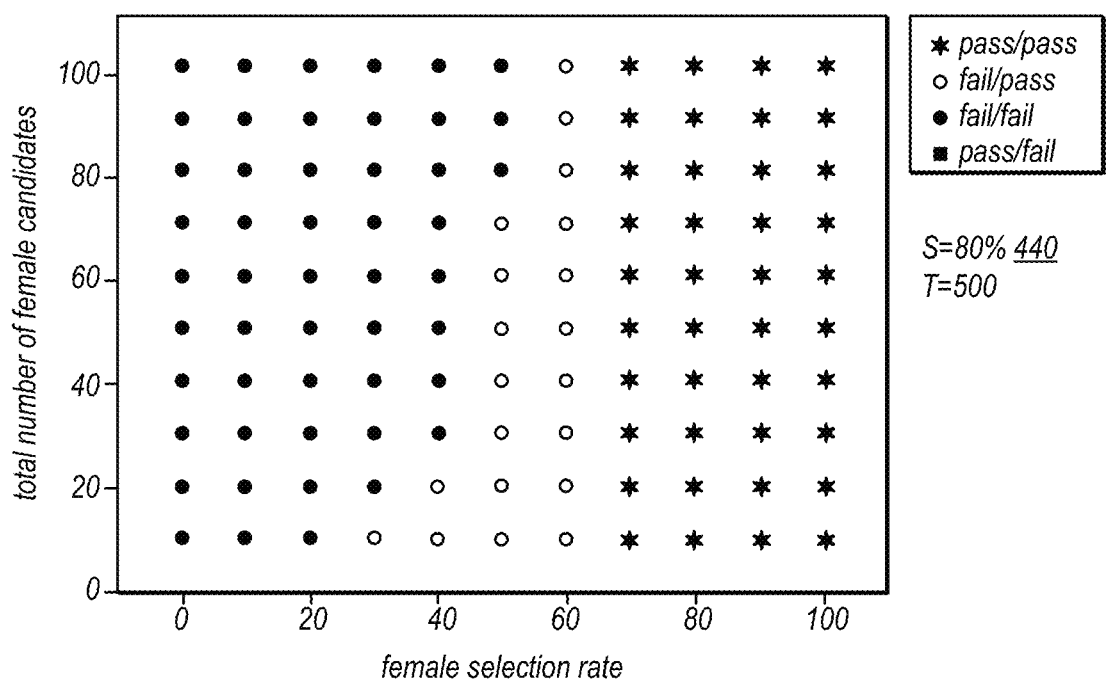
Figure 5A:
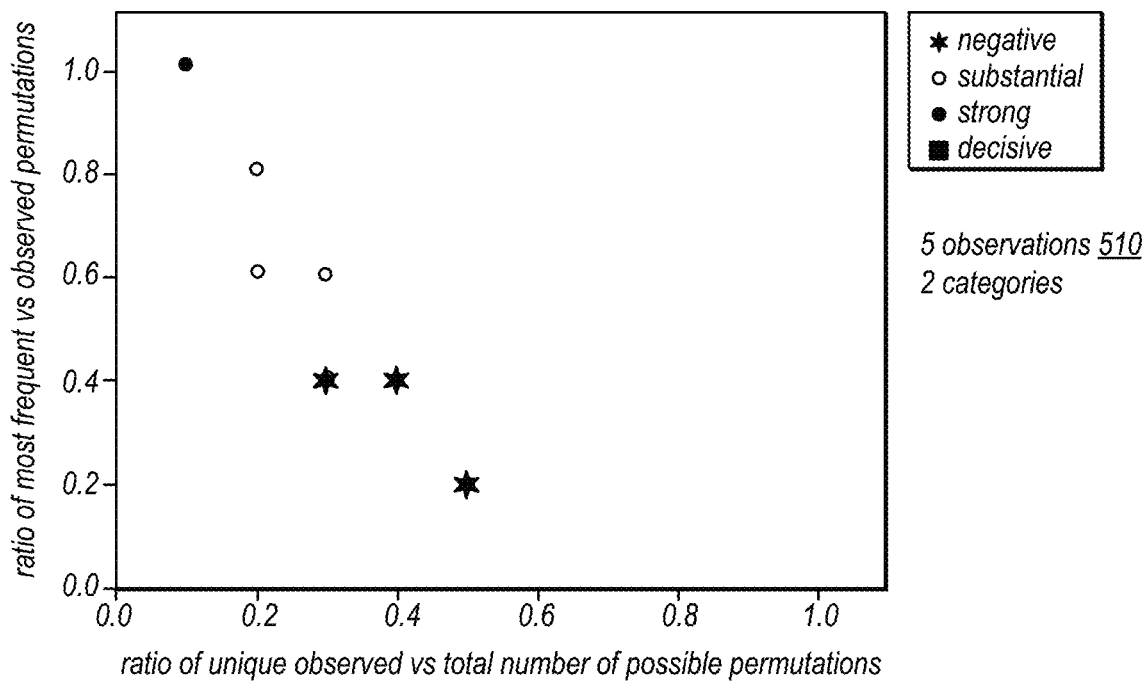
FIG. 5A-5D illustrate example analyses of the application of Bayes factors to test for fairness in a ranking process, in some embodiments.
Figure 5B:
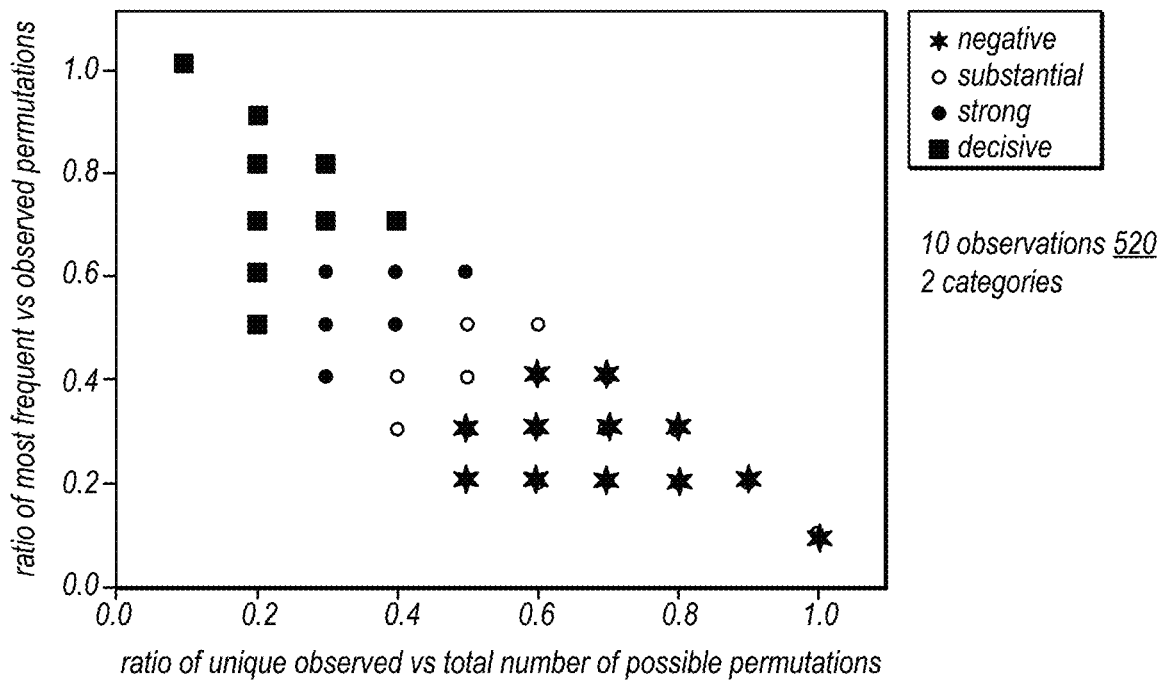
Figure 5C:
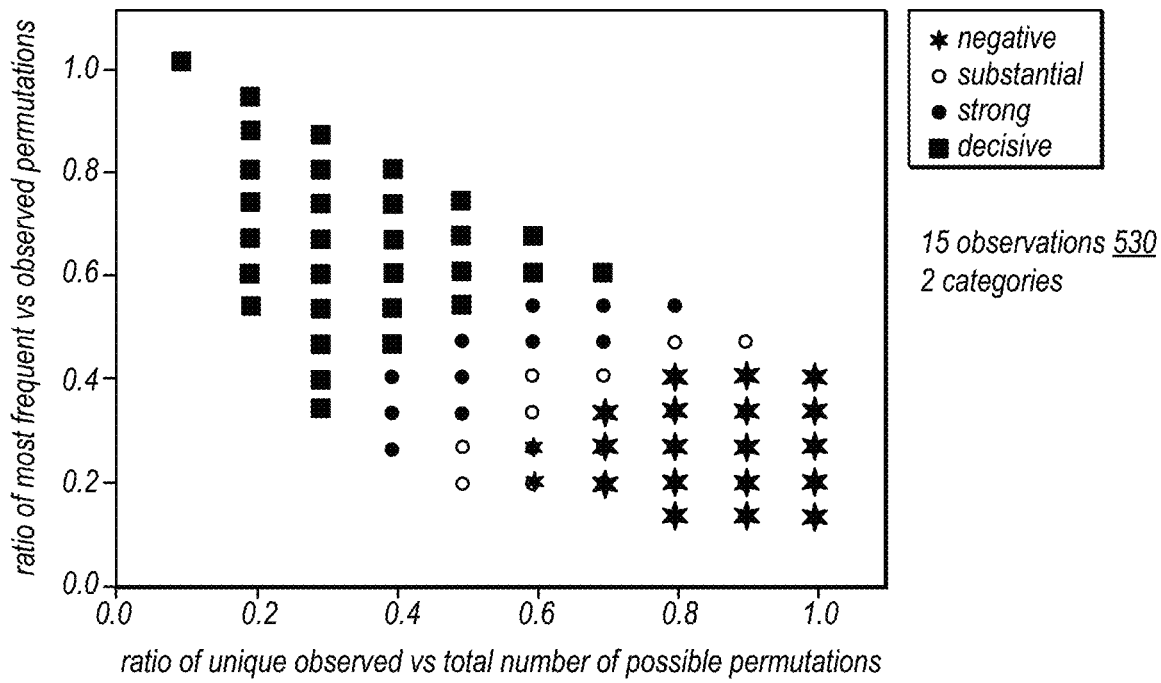
Figure 5D:
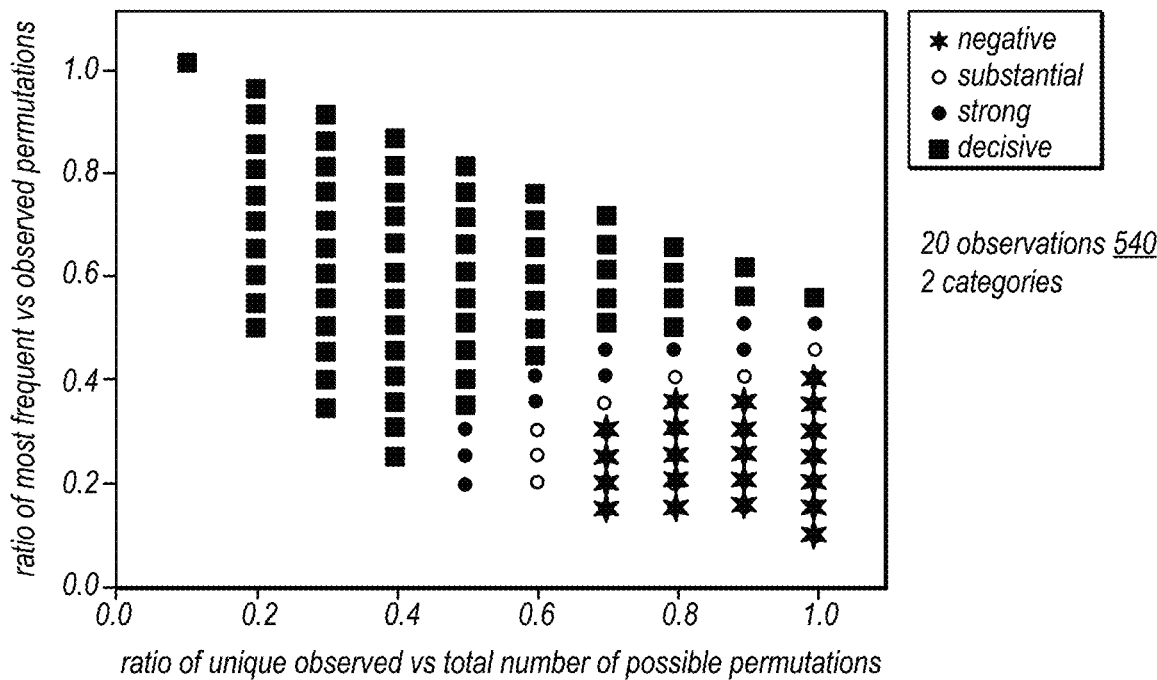
Figure 6A:
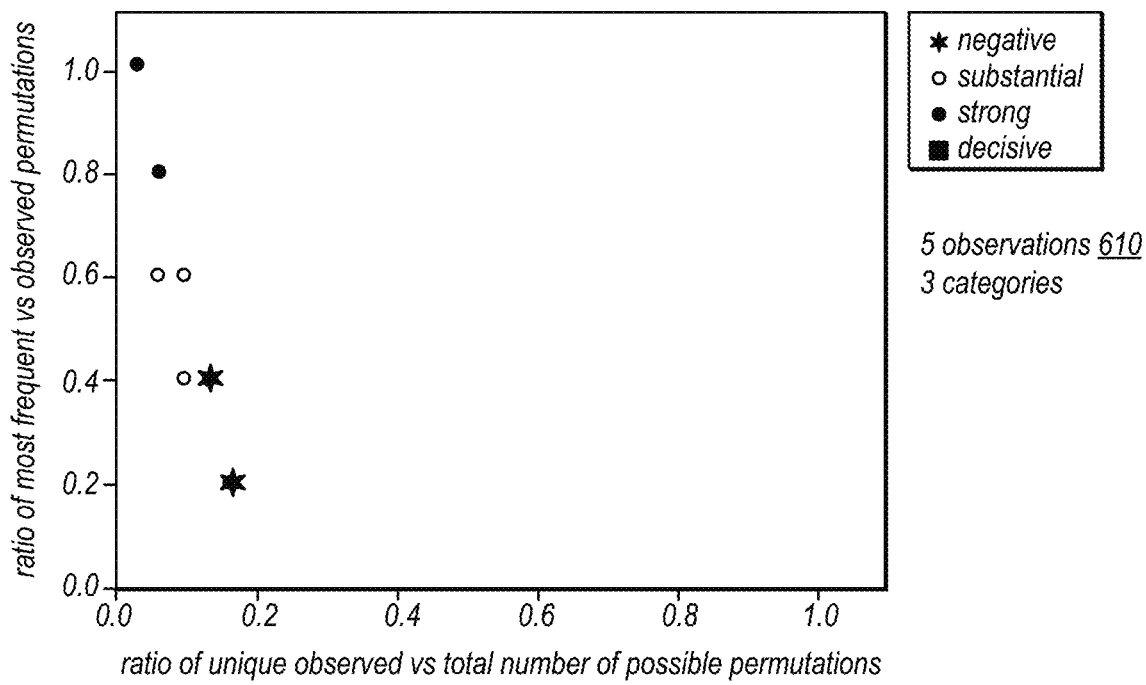
FIG. 6A-6D illustrate example analyses of the application of Bayes factors to test for fairness in a ranking process, in some embodiments.
Figure 6B:
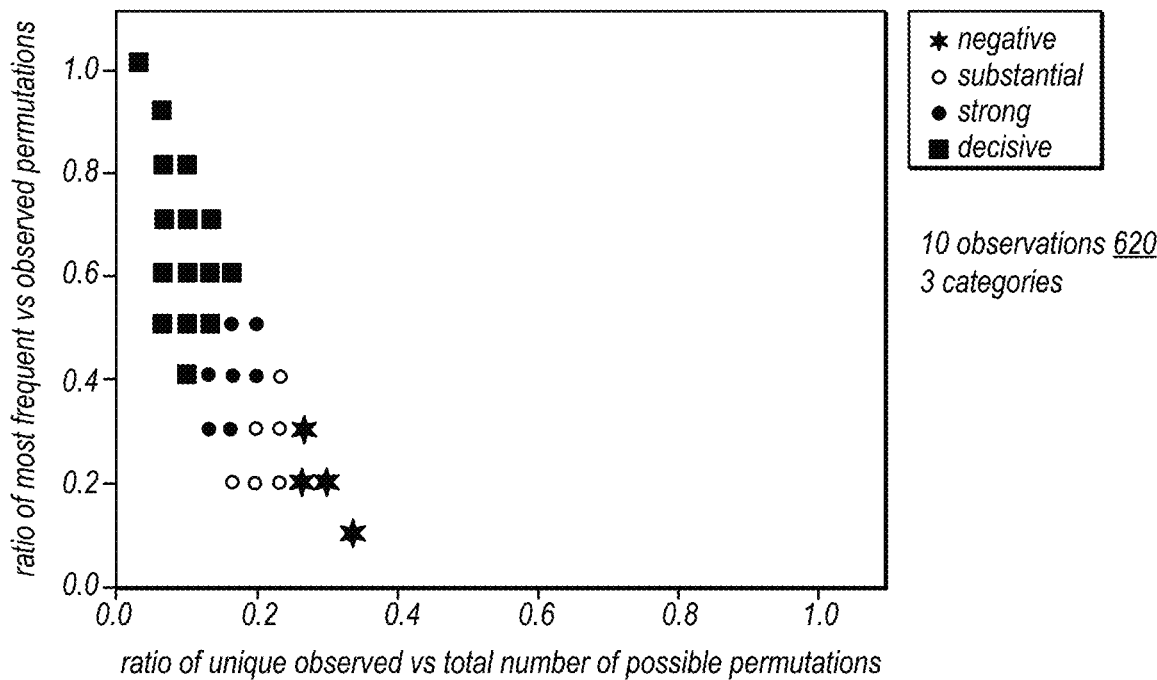
Figure 6C:
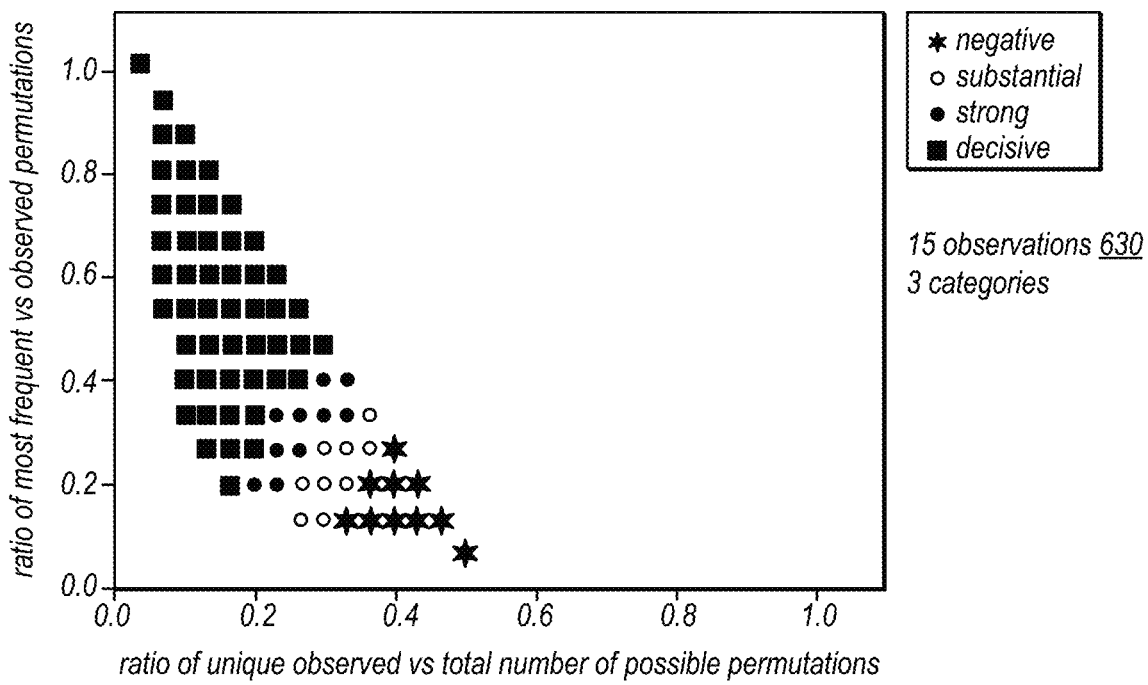
Figure 6D:
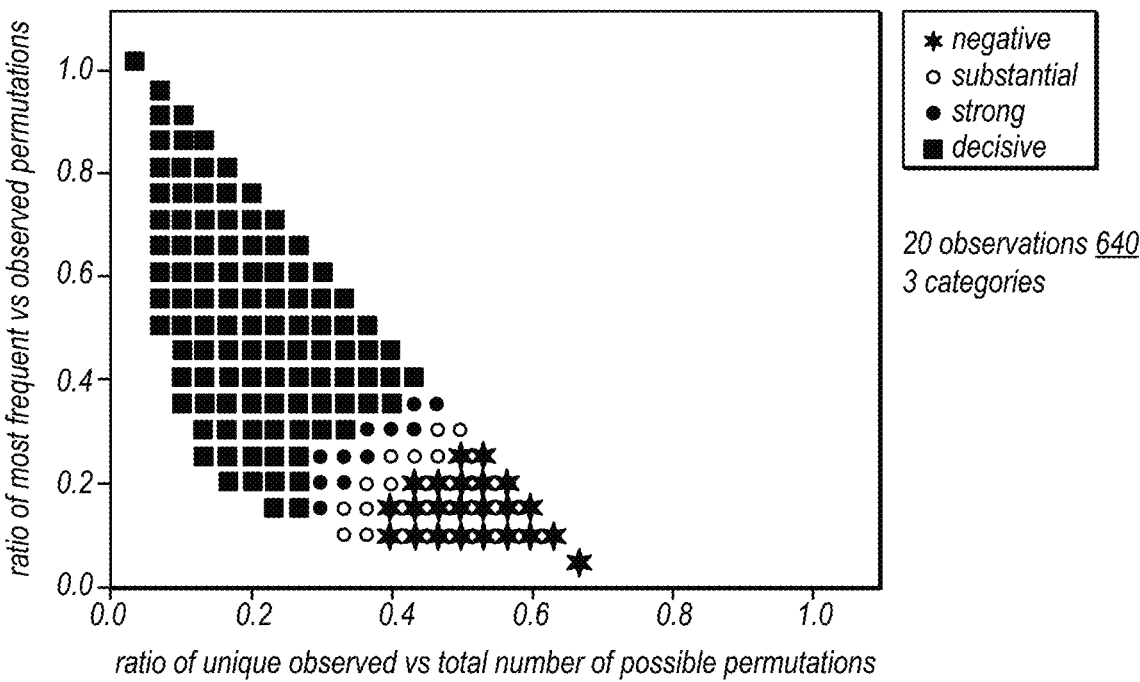
Figure 7A:
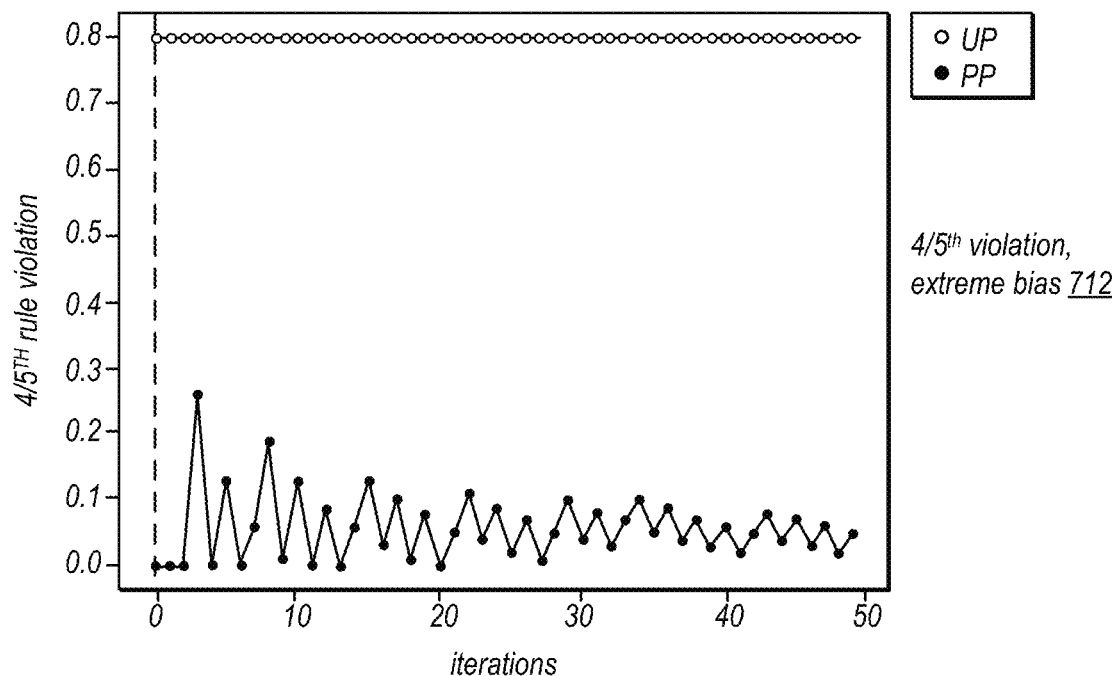
FIG. 7A-7H illustrates example analyses of online post-process and no post-processing over simulated ranking samples, in some embodiments.
Figure 7B:
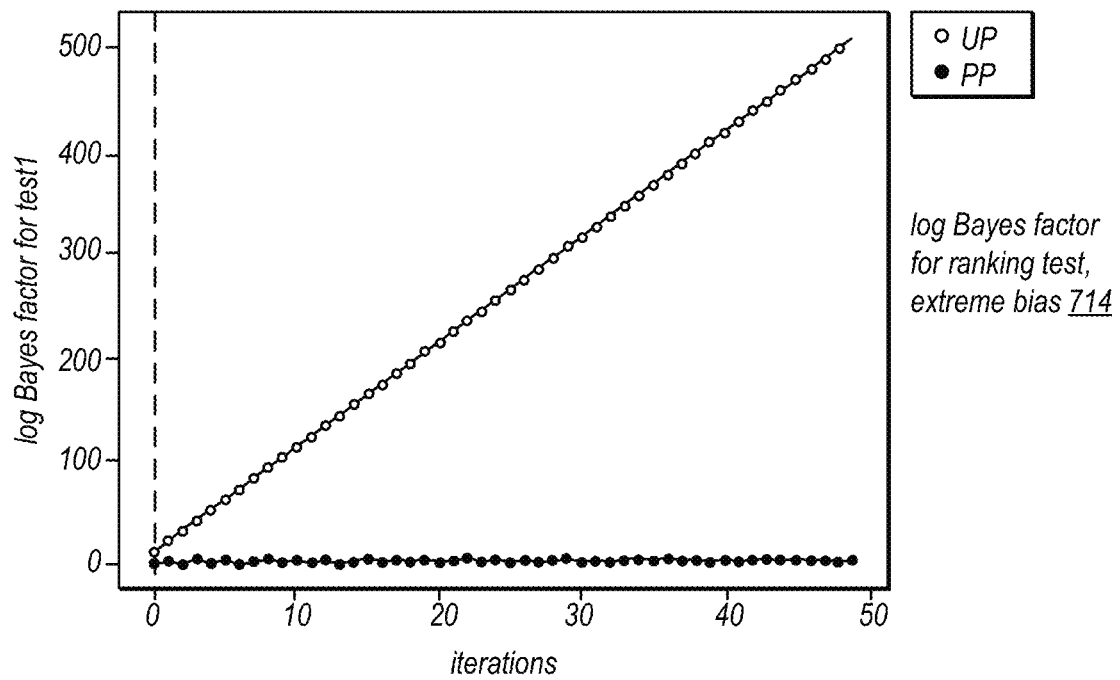
Figure 7C:
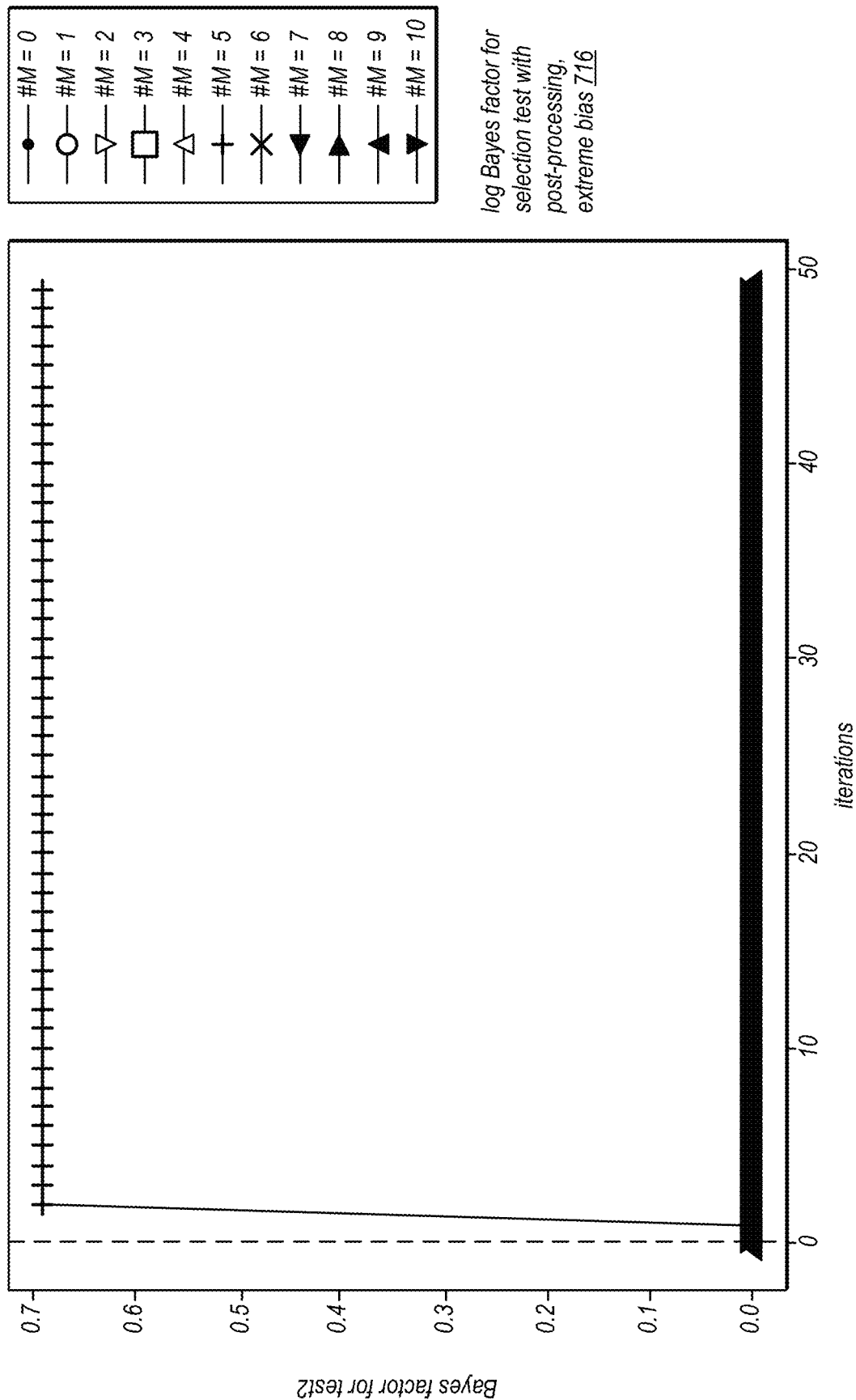
Figure 7D:
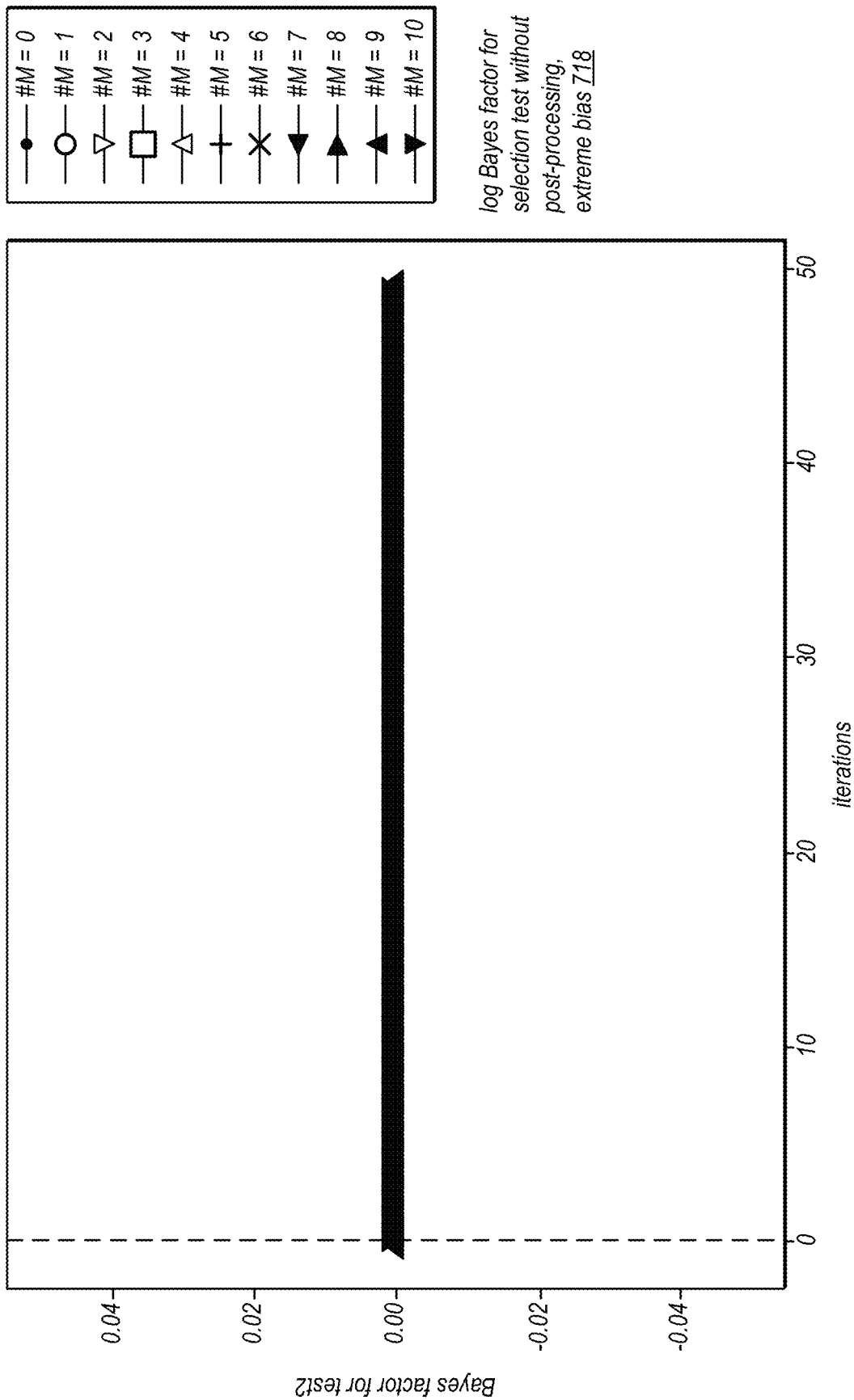
Figure 7E:
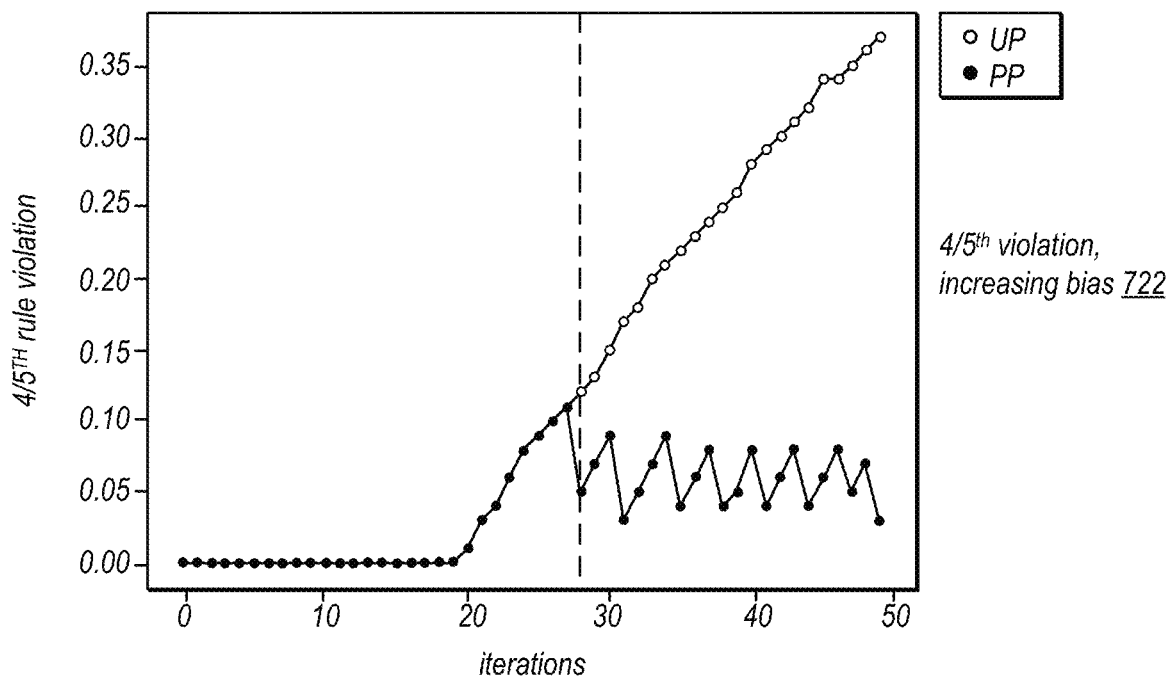
Figure 7F:
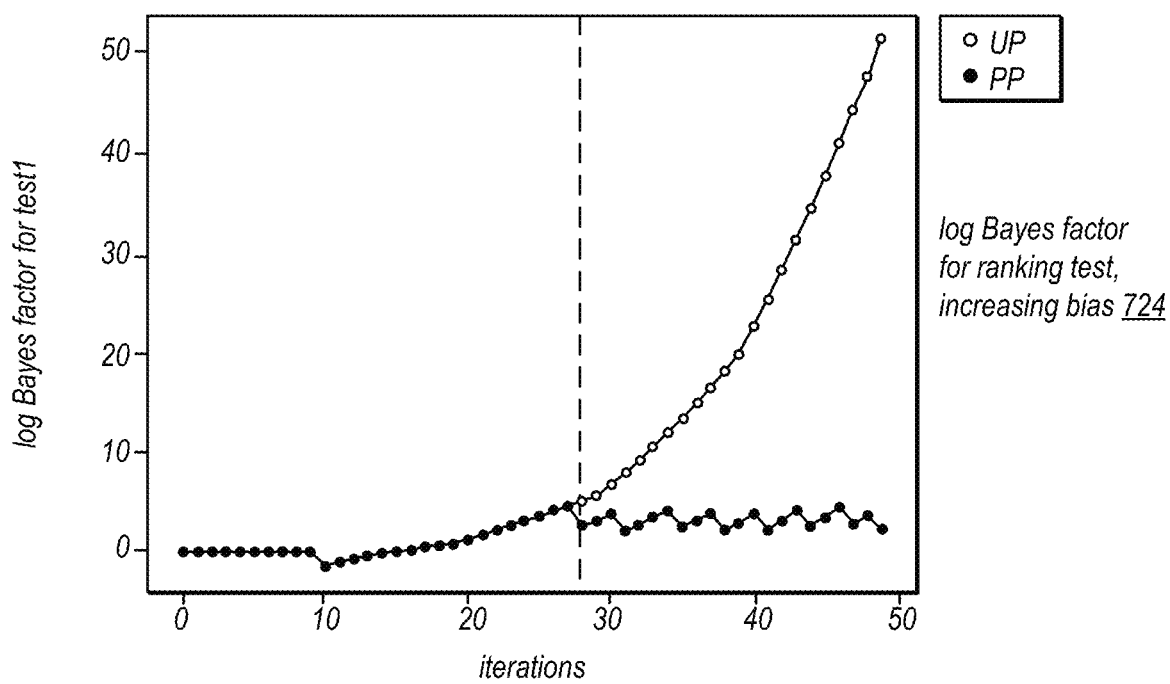
Figure 7G:
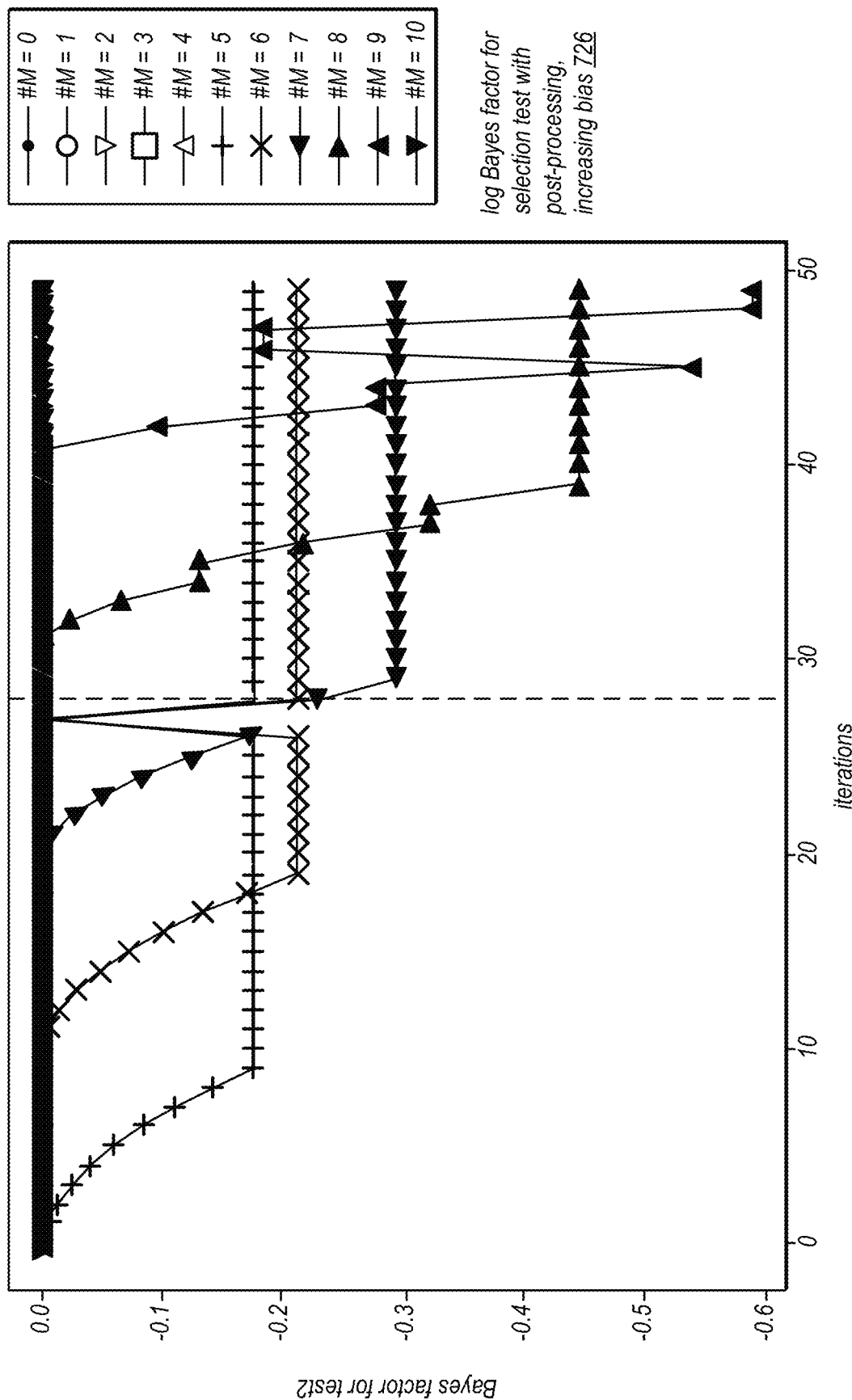
Figure 7H:
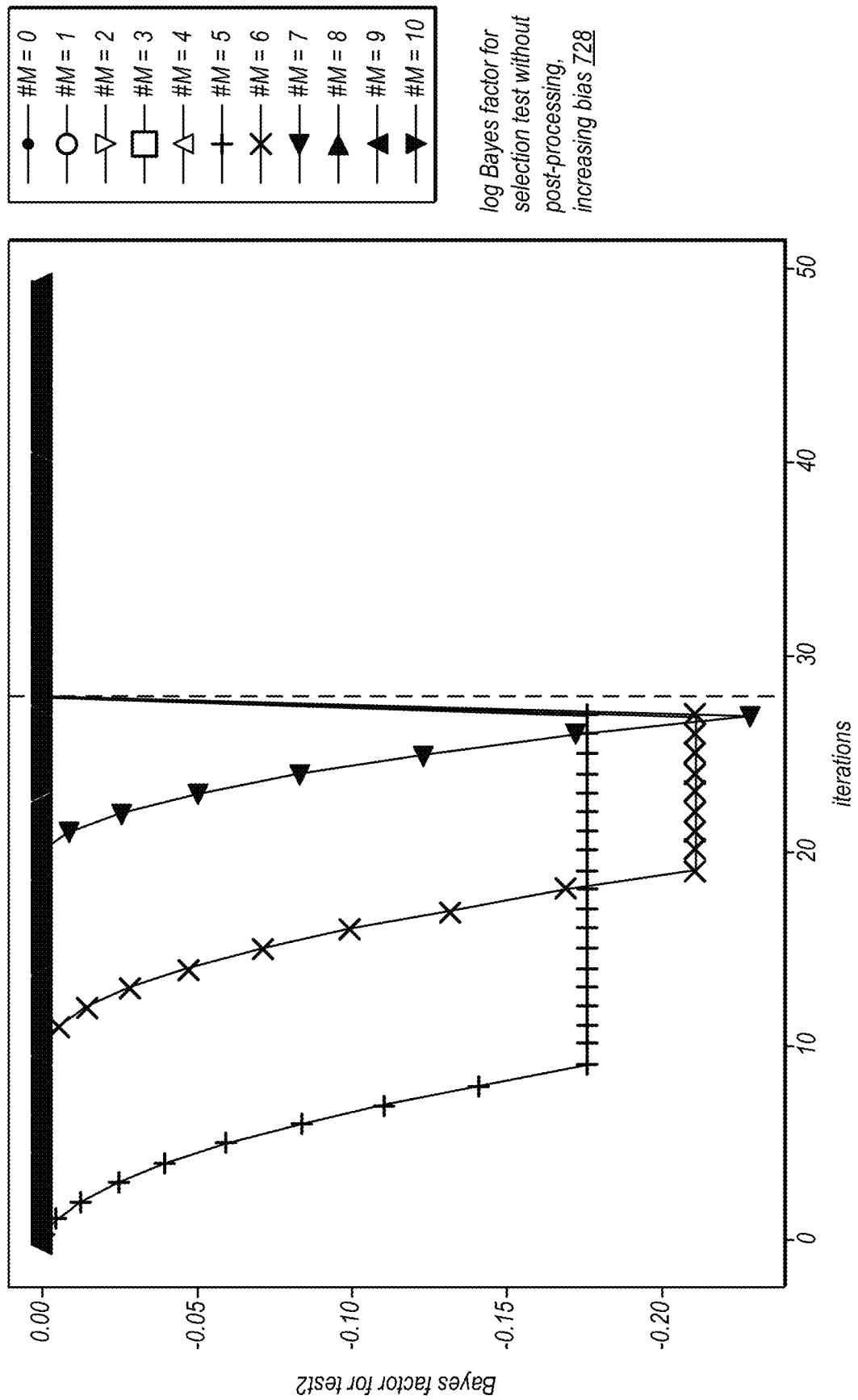

FIG. 2D is a flow diagram illustrating methods and techniques for modifying a ranking of items with respect to a protected class, according to some embodiments. In some embodiments, a ranking modifier, such as the Ranking Modifier 140 of the Control System 100, as discussed in connection with FIG. 1, may perform the below techniques.

As indicated in operation 262, a protected feature is determined by which the first and second likelihoods of bias were generated. In various embodiments, this protected feature may be personal attribute such as race, age, gender or religion, although other protected features will be apparent to those skilled in the art and these examples are not intended to be limiting. As shown in 264, the ranking of items may then be modified with respect to the identified protected feature, the modification preserving the ranking of items sharing the same protected group or value of the identified protected feature. For example, in some embodiments ranking of candidates considering gender as the identified protected class, a ranking of candidates with respect to gender may reorder the ranking by elevating the rank of one or more candidates within a particular gender group, for example by elevating one or more female candidates above male candidates. The modification in this example, however, would preserve the relative ranking of female candidates and male candidates. Once this reordering is performed, the process is complete.

Use of Bayesian Tests of Demographic Parity for Learning to Rank

In various embodiments, the input to the control system may be a set of N analyses $\mathcal{P}_i, g_i, \alpha_i, \beta_i$) in which each analysis i includes a pool of candidates $\mathcal{P}_i$, its associated protected attributes $g_i$, for example 1 if the candidate is female and 0 if the candidate is male), the associated selection $\alpha_i$ which maps every candidate from $\mathcal{P}_i$ to 1 or 0 to indicate whether they are recommended or not and ranking $\beta_i$ which maps some candidates from $\mathcal{P}$ to an integer describing its position in the ranking, so if a candidate p is listed at position k then $\alpha(p)=k$. In this example, protected feature is gender including two classes, male and female.

In various embodiments, the aggregate pool of candidates may be $\mathcal{P} = \cup \mathcal{P}_i$ and without loss of generality it may be considered that all the $\mathcal{P}_i$ are disjoint. For all $p \in \mathcal{P}_i$ the aggregate functions may be defined $g=g_i(p)$, $\alpha(p)=\alpha_i(p),\beta(p)=\beta_i(p)$. The pool can be partitioned between the male candidates $\mathcal{P}_m = \{p \in \mathcal{P} \,|\, g(p)=0\}$ and the female candidates $\mathcal{P}_f = \{p \in \mathcal{P} \,|\, g(p)=1\}$. The set of selected candidates may be defined as $\mathcal{P}^s = \{p \in \mathcal{P} \,|\, \alpha(p)=1\}$ and the selected males and females may be defined as $\mathcal{P}_m^r = \mathcal{P}^s \cap \mathcal{P}_m$ and $\mathcal{P}_f^r = \mathcal{P}^s \cap \mathcal{P}_f$ respectively.

In various embodiments, techniques for providing an improved test for ranking fairness are described. First, it may be recognized that in many cases, the result of a ranking may be displayed on a web (or other) application in which only a limited number of the top candidates appear. A user of such an application will usually go through the ranked candidates from top to bottom, and the position within the ranking may be determinative. Instead of providing a visibility function, in various embodiments two distinct tests may be applied. The first test may ensure that the selection process for which the top candidates appear satisfies demographic parity (in particular the four-fifths rule). The second test may ensure that the set rankings represent all the permutations of protected feature, gender in this example.

In various embodiments, for such tests to be useful and relevant a consideration must be made regarding the a minimum amount of evidence needed to identify bias. For example, small sample sizes may offer insufficient granularity to apply a four-fifths test. To account for the amount of evidence that supports whether a ranking is not fair, in various embodiments an assumption may be made that the ranking is fair and the evidence to reject such assumption using Bayes factors may be measured.

In various embodiments, the first test may be for the fairness of the selection process, for which we employ the four-fifths rule, a well-known relaxation of demographic parity in which the selection rate of a protected group must be at least four-fifths of the most prominent group. Given the same example assuming gender as the protected feature, let the random variables $Y_i$ denote the selection/rejection for each female candidate i and Y the vector of all such variables. To measure the evidence that the four-fifths rule might be violated, a Bayes factor may be defined as $b_{a0}=P_a(\overline{Y})/P_0(\overline{Y})$ where $P_0(\mu, \overline{Y})$ is the null hypothesis model that captures that the selection rate of the female candidates $\mu$ is fair, and $P_a(\mu, \overline{Y}))$ is the alternative hypothesis that captures that the selection is biased. Let $\mu^*$ be the selection rate of the males, the null model (left) and the alternative model (right) are defined as follow $$\mu \sim U\left(\frac{4}{5}\mu^*, 1\right) \quad (1)$$

$$Y_i \sim Bern(\mu) \; i \in [N] \quad (2)$$

$$\mu \sim U\left(0, \frac{4}{5}\mu^*\right) \quad (3)$$

$$Y_i \sim Bern(\mu) \; i \in [N] \quad (4)$$

As neither the evidence of the null model $P_0(\overline{Y})$ nor that of the alternative $P_a(Y_i)$ have a closed form solution, in some embodiments a Monte Carlo integration may be implemented which may be performant in scenarios where the space is only two dimensional.

For M samples the probability can be estimated as $$P_0(\overline{Y}) \approx \frac{1}{1 - 4/5\mu} \frac{1}{M} \sum_j^M \prod_i^N P(Y_i \mid \mu_j) \mu_j \sim U(4/5\mu, 1) \quad (5)$$

In various embodiments, to derive the M samples, $P_a(X_i, Y_i)$ and $P_0(X_i, Y_i)$ may be referred to as the evidence of their respective models. The quantity $P_a(X_i, Y_i)$ has a closed-form solution $$P_a(X_i, Y_i) = \quad (d1)$$

$$\int_{\mu_1} \int_{\mu_2} Beta(\mu_1; 1, 1) Beta(\mu_2; 1, 1) Bern(X_i; \mu_1) Bern(Y_i; \mu_2) d\mu_2 d\mu_1$$

$$= \int_{\mu_1} \prod_i^{N_1} \mu_1^{X_i} (1-\mu_1)^{1-X_i} d\mu_1 \times \int_{\mu_2} \prod_i^{N_2} \mu_2^{Y_i} (1-\mu_2)^{1-Y_i} d\mu_2 \quad (d2)$$

$$= \frac{\Gamma(1 + \Sigma_i^{N_1} X_i) \Gamma(1 + N_1 - \Sigma_i^{N_1} X_i)}{\Gamma(2 + N_1)} \times \frac{\Gamma(1 + \Sigma_i^{N_2} Y_i) \Gamma(1 + N_2 - \Sigma_i^{N_2} Y_i)}{\Gamma(2 + N_2)} \quad (d3)$$

In some embodiments, a closed-form for $P_0(X_i, Y_i)$ may be unknown, so an approximation may be used according to a Monte Carlo integration $$P_0(X_i, Y_i) = \int_{\mu_1} \int_{\mu_2} Beta(\mu_1; 1, 1) U\left(\mu_2; \frac{4}{5}\mu_1, 1\right) Bern(X_i; \mu_1) Bern(Y_i; \mu_2) d\mu_2 d\mu_1 \quad (d4)$$

$$\approx \frac{1}{N} \sum_i^N Bern(X_i; \mu_1) Bern(Y_i; \mu_2) \text{ where } \mu_1, \mu_2 \sim P_0(\mu_1, \mu_2) \quad (d5)$$

$$\int_\theta \mu(\theta) \prod_{\pi \in O_{ab}} \theta_\pi d\theta = \int_\theta \frac{\Gamma(\Sigma_{\pi \in \Pi_{ab}} \rho_\pi)}{\prod_{\pi \in \Pi_{ab}} \Gamma(\rho_\pi)} \prod_{\pi \in \Pi_{ab}} \theta_\pi^{\rho_\pi - 1} \prod_{\pi \in O_{ab}} \theta_\pi d\theta \quad (d6)$$

$$= \int_\theta \frac{\Gamma(\Sigma_{\pi \in \Pi_{ab}} \rho_\pi)}{\prod_{\pi \in \Pi_{ab}} \Gamma(\rho_\pi)} \prod_{\pi \in \Pi_{ab}} \theta^{\#\pi + \rho_\pi - 1} d\theta \quad (d7)$$

$$= \frac{\Gamma(\Sigma_{\pi \in \Pi_{ab}} \rho_\pi)}{\prod_{\pi \in \Pi_{ab}} \Gamma(\rho_\pi)} \frac{\prod_{\pi \in \Pi_{ab}} \Gamma(\#\pi + \rho_\pi)}{\Gamma(\Sigma_{\pi \in \Pi_{ab}} \#\pi + \rho_\pi)} \int_\theta \frac{\Gamma(\Sigma_{\pi \in \Pi_{ab}} \#\pi + \rho_\pi)}{\prod_{\pi \in \Pi_{ab}} \Gamma(\#\pi + \rho_\pi)} \prod_{\pi \in \Pi_{ab}} \theta^{\#\pi + \rho_\pi - 1} d\theta \quad (d8)$$

$$= \frac{\Gamma(\Sigma_{\pi \in \Pi_{ab}} \rho_\pi)}{\prod_{\pi \in \Pi_{ab}} \Gamma(\rho_\pi)} \frac{\prod_{\pi \in \Pi_{ab}} \Gamma(\#\pi + \rho_\pi)}{\Gamma(\Sigma_{\pi \in \Pi_{ab}} \#\pi + \rho_\pi)} \quad (d9)$$

In various embodiments, a Bayes factor can then be used to decide whether or not there is enough evidence to reject the null hypothesis in favor of the alternative. Moreover, since the measure is continuous, it is highly suitable for guiding a post-processor.

In analyses in FIGS. 3 and 4 a comparison of the Bayes factor test to the classic four-fifths test to detect unfairness (a Bayes factor greater than 100 is considered a decisive rejection of the null) is illustrated. In each plot (310, 320, 330, 340, 410, 420, 430 and 440), the horizontal axis shows the female selection rate and the vertical axis the total number of female candidates. The star-shaped points for "Pass/Pass" may indicate an agreement that there is no discrimination, darker round points "Fail/Fail" may indicate agreement that there is discrimination, light round points for "Fail/Pass" may indicate that the four-fifths rule failed and that the Bayes factor test passed, and the square point for "Pass/Fail" may indicate that the four-fifths rule passed and that the Bayes factor rest failed. Different selection rates S for males and different total number of male candidates T are plotted in the figures.

The illustrated analyses may indicate various performance features or attributes of at least some embodiments of the techniques described herein. First, if the four-fifths test passes, then the Bayes Factor test passes as well, indicating that the Bayes factor test may not be stricter than the four-fifths test. Second, if the four-fifths test fails, then the Bayes factor test on almost always fails. Third, when the four-fifths test fails but the Bayes factor test passes, indicates that when the evidence is small, the test is not more lenient if there isn't statistical evidence to support the alternative theory.

In various embodiments, a test for the top k rankings can be defined. This test is allows analysis of different permutations of the protected features proposed by the ranking so that it should not be the case that some permutations are much more likely than others. It is not merely the case that a protected feature should have equal probability of appearing at any position in the ranking since this may fail to account for class imbalances.

As mentioned previously, each analysis may have C recommended candidates, that is, $|\{p \in \mathcal{P}_i | \alpha_i(p)=1\}|=C$ for all i. Consider a permutation $\pi$ of length C over the objects {0,1} where $a$ of them are 0 and b of them are 1 (and therefore a+b=C). We say that a permutation $\pi_{ab}$ matches a ranking $\beta_i$ and write $\beta_i \vDash \pi$ if for all $k \in \{1, \ldots, C\}$ we have $\pi_{ab}(k)=g_i(\beta_i^{-1}(k))$ where $\beta_i^{-1}$ is the inverse of $\beta_i$ which always exists. Given a permutation $\pi$, let $\#\pi = |\{\beta_i | \beta_i \vDash \pi\}|$ the number of rankings that match the permutation. Write $\Pi_{ab}$ for the set of permutations of length C with a 0 and b 1. We define the empirical probability $\hat{p}$ of a permutation $\pi \in \Pi_{ab}$ as $$\hat{p}(\pi) = \frac{\#\pi}{\Sigma_{\pi \in \Pi_{ab}} \#\pi}.$$

Consider a specific pair (a,b) such that a+b=C, the corresponding set of permutations $\Pi_{ab}$ and the set $\mathcal{O}_{ab}$ of rankings that match such permutations that is $\mathcal{O}_{ab}=\{g_i \circ \beta_i^{-1} | \beta_i \vDash \pi \wedge \pi \in \Pi_{ab}\}$.

As with selection test discussed above with regard to FIGS. 3 and 4, a null and an alternative hypothesis to capture whether there is evidence of discrimination may be implemented, in various embodiments. A first hypothesis may correspond to a model where it is assumed that each $o_i \in \mathcal{O}_{ab}$ is drawn independently and identically distributed (i.i.d.) from a uniform distribution of size $|\Pi_{ab}|$. Our second hypothesis is that the $o_i$ are drawn i.i.d. from a categorical distribution whose parameter is distributed according to a Dirichlet measure µ parameterized by a vector p.

$$o_i \sim U(1, |\Pi_{ab}|) \quad (6)$$

$$\theta \sim \text{Dirichlet}(p) \quad (7)$$

$$o_i \sim \theta \quad (8)$$

Assuming that the two models are equally probable, we may modify this test to study the data by modifying the probability of the models or the parameters of the Dirichlet distribution. The Bayes factor $K_{ab}$ of the two models is therefore $$\frac{\int_\theta \mu(\theta) \prod_{\pi \in O_{ab}} \theta_\pi d\theta}{\prod_{\pi \in O_{ab}} \theta_\pi}$$

where $$\int_\theta \mu(\theta) \prod_{\pi \in O_{ab}} \theta_\pi d\theta = \frac{\Gamma(\Sigma_{\pi \in \Pi_{ab}} \rho_\pi)}{\prod_{\pi \in \Pi_{ab}} \Gamma(\rho_\pi)} \frac{\prod_{\pi \in \Pi_{ab}} \Gamma(\#\pi + \rho_\pi)}{\Gamma(\Sigma_{\pi \in \Pi_{ab}} \#\pi + \rho_\pi)} \quad (9)$$

In this case, the two models are in closed form.

In these analyses in FIGS. 5 and 6, the Bayes factor test is applied to sets with N observed permutations. In each plot (510, 520, 530, 540, 610, 620, 630 and 640), Some sets of permutations are more unfair than others, and quantification is performed using two indicators: how many of the 10 permutations are observed (x axis, small is less fair) and what fraction of the overall observed ranking the most frequent one represents (y axis, larger is less fair). FIGS. 5 and 6 light round points (substantial), dark round points (strong) and square points (decisive) if the log-Bayes factor is greater than log(2), log(10), and log(100) respectively. Otherwise, a star point (negative) is reported. These values are commonly used in analyzing Bayes factors. Each subplot reports on a different amount of observed data. FIG. 6 reports on the same type of analyses but where three categories are used with occurrences five, ten, fifteen and twenty.

In various embodiments, the case in which the candidate pools $\mathcal{P}$ (and their ranked list of selected k) are observed one at a time in a sequence may be considered, resulting in a set of candidate pools that accretes over time. Once the tests have sufficient evidence to determine that the ranked sets of k candidates are collectively biased, then action to improve fairness for the ranked k selected from subsequent candidate pools may be taken, in various embodiments. For this purpose, a two-stage post-processor that optimizes over the continuous Bayes factors of the two tests to improve the fairness may be implemented in at least some embodiments. The first stage of the post-processor may improves fairness with respect to the Bayesian test for the four-fifths rule and the second stage improves fairness with respect to the Bayesian test for the permutations, for example.

Control System Using Bayes Factor for Enforcing Fairness in Ranking

In various embodiments, a two-stage post-processor that optimizes over the continuous Bayes factors of the two tests to improve the fairness may be implemented. The first stage of the post-processor improves fairness with respect to the Bayesian test for the four-fifths rule and the second stage improves fairness with respect to the Bayesian test for the permutations. The post-processing algorithm is designed to respect the original ranking as much as possible while getting us closer to passing the tests. Therefore, it should ideally satisfy the following conditions: a) if the test is satisfied, there should be no change in the rankings, b) any changes introduced by post-processing should only improve fairness criteria, c) within a given protected group, ordering must be preserved as in the original ranking and d) is the condition for maximizing the notion of utility: the distance (according to the metrics discussed below) between the original and post-processed recommendations should be minimized.

In practice, post-processing may operate in an online setting since it is not possible to change any rankings that were observed in the past time steps and there is no knowledge about future rankings. Therefore, in various embodiments, post-processing may improve fairness by making changes only to the current ranking, while utilizing information from the set of rankings observed in the past time steps. Below is described each stage in more detail, followed by the algorithm which incorporates the two post-processing steps in an online setup.

Consider the following example notation. Let $\mathcal{R} = \{r_1, \ldots, r_n\}$ be a set of n rankings of corresponding candidate pools $\mathcal{P}_i$ (according to $\beta_i$), from which k candidates are actually selected (according to $\alpha_1$). Let $s_i$ be a vector of the relevance scores of the candidates. As an example, $r_i = [M, M, F, F]$ has the associated $g_j = [1,1,0,0]$, $\alpha_j = [1,1,1,0]$ for K=3 and $s_j = [0.9, 0.8, 0.8, 0.8]$, which induces the permutation $\beta_i = [0,1,2,3]$.

A two step approach for enforcing fairness with respect to the two tests described earlier may be implemented, in some embodiments. In the first step the Bayes factor of a Bayesian hypothesis test may be optimized for the four-fifths rule. In the second step the Bayes factor of a Bayesian hypothesis test may be optimized for a permutation test. The first optimization may be performed over the number of candidates from each protected group, in the top K recommendations. As an example, $r_i = [M, M, M, F]$ is re-ranked as [M, M, F, F]. The latter optimization is done over the probability simplex of permutations, in order to make a randomized choice of ranking which provides some privacy as to how fairness is enforced. Again as an example, $r_i = [M, M, F]$ is re-ranked as [F, M, M].

The post-processing algorithm is designed to respect the original ranking as much as possible while optimizing to pass the tests. Therefore, in at least some embodiments, post processing may satisfy the following conditions: a) if the test is satisfied, there should be no change in the rankings, b) any changes introduced by post-processing should only improve fairness criteria, c) within a given protected group, ordering may be preserved as in the original ranking and d) is the condition for maximizing the notion of utility: the distance (according to the metrics discussed below) between the original and post-processed recommendations should be minimized.

In practice, post-processing should operate in an online setting since it is not possible to change any rankings that were observed in the past time steps and there is no knowledge about future rankings. Therefore, the objective is to improve fairness by making changes only to the current ranking, while utilizing information from the set of rankings observed in the past time steps.

In order to satisfy the selection test, the Bayes factor for this test may indicate that there is insufficient evidence for unfairness in the way in which the K candidates are selected. It may be possible to begin optimizing the log Bayes factor corresponding to the selection test, in some embodiments. This is a discrete optimization problem over the number of candidates from each protected group in the top K positions. To solve this problem, structure in the search space may be leveraged by using the four-fifths rule as a surrogate condition. To explicitly incorporate the Bayes factor information, a slack parameter in the four-fifths constraint may be added which is computed as a function of the log Bayes factor.

Let $\mathcal{R} = \{r_1, \ldots, r_j\}$ be the set of rankings that have been observed up to time point $t-1$, which is the first time-step at which the test detects unfairness. The rankings up to this point are a sunk cost in terms of fairness since it is not possible to go back in time and modify them. However, the post-processor can begin improving each subsequent ranking beginning with the current ranking $r_j$. The test can still incorporate previous rankings as evidence for the purpose of post-processing future rankings, in some embodiments.

Let $\alpha'_j$ be the vector where each position indicates the probability of a candidate being selected into the top K, after post processing. Let $r'_j$ be the post-processed ranking. The objective is then to compute $\alpha'_j$ so as to minimize a certain distance metric from the original ranking $r_j$. This distance may be defined as $d(r_j, r'_j)$ as the difference from the original total score $\Sigma_{p \in \mathcal{P}_j} s_{jp} \alpha_{jp}$ for the top K candidates, where $\mathcal{P}_j$ is the set of candidates in a given ranking $r_j$. Note that $d(r_j, r'_j) \geq 0$ because recommending a candidate which was not in top K in the original recommendation results in a decrease in the top K score. Next, the problem may be expressed as the following integer linear program:

$$\underset{\alpha'_j}{\text{minimize}} \sum_{p \in \mathcal{P}_j} \left[ s_{jp} \alpha_{jp} - s_{jp} \alpha'_{jp} \right] \text{ subject to } \sum_{p \in \mathcal{P}_j} \alpha'_{jp} = K, \forall p; \quad (10a)$$

$$\frac{\Sigma_{r_i \in \mathcal{R}} \Sigma_{p \in \mathcal{P}_i} \alpha'_{ip}(1 - g_{ip})}{\Sigma_{r_i \in \mathcal{R}} \Sigma_{p \in \mathcal{P}_i}(1 - g_{ip})} - \frac{4}{5} \frac{\Sigma_{r_i \in \mathcal{R}} \Sigma_{p \in \mathcal{P}_i} \alpha'_{ip} g_{ip}}{\Sigma_{r_i \in \mathcal{R}} \Sigma_{p \in \mathcal{P}_i} g_{ip}} \geq \epsilon_1 \quad (10b)$$

$$\alpha'_{jp} \in \{0, 1\}, \forall p$$

where the first set of constraints in 10a enforce that there are exactly K selected candidates in each job posting. The second constraint 10b is the four-fifths rule (defined according to the majority group), where the left term computes the (aggregated) selection rate of females given $\alpha'$ and the right term computes that for the males, $\epsilon_1$ is a variable that represents the deviation from satisfying the constraint. Note that the constraint 10b depends on the majority group and should be defined accordingly, in some embodiments. When there are more than two categories in the protected field, one such constraint may be added for each category that is in the minority.

The amount of deviation E in the constraint allows utilization of the output of the tests as feedback and decides how aggressively to enforce the constraint 10b. For example, $\epsilon_1 = 0$ allows the enforcement of the four-fifths condition most aggressively, whenever it is feasible (i.e., whenever there are sufficient number of candidates in the pool that belong to the minority category). When this is not the case, the constraint 10b cannot be satisfied even when either a) all the applicants in the minority group are moved into the top K recommendation or b) all the candidates in top K recommendations belong to the minority group, depending on the particular situation. Accordingly, an appropriate value for $\epsilon_1$ may be assigned in order to address the infeasibility in the above situations. More specifically, consider the case when the number of minority group applicants in the pool is greater than K but is not sufficient to satisfy the four-fifths condition in aggregate. In this case, the best post-processing can do is to recommend the top K minority group candidates. To achieve this objective, $\epsilon_{1alt}$ may be computed as the difference between four-fifths of the majority selection rate and the minority selection rate, where the top K recommendations belong to the minority group. Note that $\epsilon_{1alt} < 0$. Now consider the second possibility in which the number of minority group candidates in the current ranking is less than K. In this case, the post-processing step should bring in all the minority group candidates into the top K recommendations. Accordingly, $\epsilon_{1alt}$ may be computed as the difference in selection rates in this situation. As a consequence, the maximum value of $\epsilon_1$, $\epsilon_{1max}$, is either equal to $\epsilon_{1alt}$ or 0, to enforce an aggressive post-processing at this stage. Additionally, observe that if there is no intention to perform any post-processing at this stage, $\epsilon_1$ may be set to the observed difference in 10b, i.e., $\epsilon_1$ = minority selection rate $-4/5$ * majority selection rate.

In order to satisfy the second stage of the test, the possible permutations of the candidates' protected attributes should be equiprobable across the rankings, within the top K recommendations. For example, if the protected attribute is gender (M or F) then the permutation FFMM should be the same probability as the permutation MMFF.

Let $\Pi_j$ be the set of permutations for a given number of male and female applicants in the top K recommendation. Let $\mu_j$ be a vector that assigns a probability of transforming an observed permutation $r_j^k$ in top K to a new permutation $\pi \in \Pi_j$. In some embodiments, this may be formulated as a linear program in which the objective is to respect the original ranking by minimizing the distance to it and to simultaneously improve fairness by minimizing the total variation distance ($l_1$-norm for countable sets) to the uniform distribution over the possible permutations. The distance metric may be defined as the edit distance between an observed permutation and the outcome permutation: $d_{j\pi} = K - \Sigma_{p=1}^{k} r_j^K \pi p$. The linear program is the following:

$$\underset{\mu_j}{\text{minimize}} \sum_{\pi \in \Pi_j} \mu_{j\pi} d_{j\pi} \quad (11)$$

$$\text{subject to } \frac{1}{2} \sum_{\pi \in \Pi_j} \left| \mu_{j\pi} - \frac{1}{|\Pi_j|} \right| \leq \epsilon_2,$$

$$\sum_{\pi=1}^{|\Pi_j|} \mu_{j\pi} = 1,$$

$$0 \leq \mu_{j\pi} \leq 1, \forall \pi$$

where $\epsilon_2$ is a slack parameter which can be adjusted according to the results of the statistical test for the second phase. Note that when $\epsilon_2 = 0$, the solution is the uniform distribution. Let $\mu_{j\pi}^{obs}$ be the observed frequency of each permutation. For a given permutation, the LHS in the absolute difference 11 evaluates to $$\frac{1}{2}\left|1 - \frac{1}{|\prod_j|}\right|,$$

therefore the solution is the original permutation when $$\epsilon_2 \geq \frac{1}{2}\left|1 - \frac{1}{|\prod_j|}\right|$$

(note that the ranking might still undergo a change because of the randomization). When $$0 < \epsilon_2 < \frac{1}{2}\left|1 - \frac{1}{|\prod_j|}\right|,$$

the solution lies between the above two boundary cases. To obtain the top K recommendations, first, a permutation may be sampled from $\Pi_j$ according to the distribution in $\mu_j$. Next, this permutation may be mapped into a ranking by assigning back the scores so as to preserve the order within each protected group. The element of randomization at this stage enables the achievement of the objective that it should not be possible to exactly recover the changes introduced by post-processing.

In various embodiments, the two-stage approach may be as described above in FIG. 2. The algorithm may iteratively adjust the rankings and items in the selected K based on the test results in each iteration.

An evaluation of the proposed post-processing algorithm on different ranking examples may be considered, as discussed with regard to FIGS. 7A-7H. In each case, the set of post-processed rankings may be compared against the set of original rankings in terms of the following metrics. First, a comparison in terms of performance on the two phases of the test, i.e., the magnitude of the log bayes factor (e.g., as illustrated at elements 714 and 724). Second, a comparison in terms of the amount of violation of the (aggregated) four-fifths condition (e.g., as illustrated at elements 712 and 722). This violation may be defined as 0 whenever the (aggregated) four-fifths condition is satisfied and as 1−(minority selection rate/majority selection rate) otherwise. Third, the observed change in total score (which may be a distance from the original ranking), at each post-processing stage during the iterations. Finally, the probabilities of observing a particular permutation in the top K recommendations may be considered, before and after post-processing (e.g., as illustrated at elements 716, 718, 726 and 728).

A basic ranking simulator may be implemented in various embodiments that generates ranking samples with a preassigned degree of bias. It takes as input, the number of applicants in each protected group for each ranking sample and computes a ranking (with the associated scores) so as to achieve a given proportion of the protected group candidates in the top K recommendations. In the illustrated examples 50 such ranking samples with gender as the protected attribute, each with 20 candidates in each group. The following cases with specific amounts of bias may be generated: a) the fair example: the top K recommendation has equal number of applicants from each group for each ranking sample, b) the extremely biased example: all candidates in the top K recommendation belong to the same protected group for each ranking sample, c) the increasingly biased example: the proportion of candidates from each group in top K increases linearly from fair (50%) to biased (100%) over the ranking samples and d) the mixed bias example: the proportion of candidates from each group in top K increases linearly from one extreme (e.g., 100% females) to the other extreme (e.g., 100% males) over the ranking samples.

In FIGS. 7A-7H, a comparison of online post-processing vs. no post-processing over simulated ranking samples (from top row to bottom row) extreme bias, increasing bias, mixed bias and fair, in terms of a) four-fifths violation, b) log bayes factor for ranking test (with and w/o post-processing) and the log bayes factor(s) for selection test with post-processing (c) and w/o post-processing (d). The vertical line indicates the first iteration when the test(s) detect discrimination.

In the first set of analyses shown in FIGS. 7A-7H, we choose the E values in order to execute postprocessing most aggressively, i.e., to make relatively large changes to the current ranking in order to improve fairness over the set of observed rankings and the current ranking. At a high level an observed expected behavior, i.e., the effect of the post-processor is most evident in the extreme bias case (712 and 722), and there is no post-processing in the fair case (718 and 728). The post-processor may be triggered at an intermediate iteration in case of the increasingly biased case (714 and 724).

In various embodiments, designs for a control system that enforces a fairness rule for a learning to rank application. A post-processor may be implemented that enforces such fairness rule more or less aggressively based on a measure of fairness that are defined using Bayes factors. In some embodiments, two distinct mathematical notions of fairness are used. In some embodiments, a modification of the four-fifths rule is used to ensure that there is no discrimination with respect to which candidates appear on the final top-K ranking. Then, a second test to ensure that all the permutations of the protected features are about equally likely to occur is used.

Figure 8:
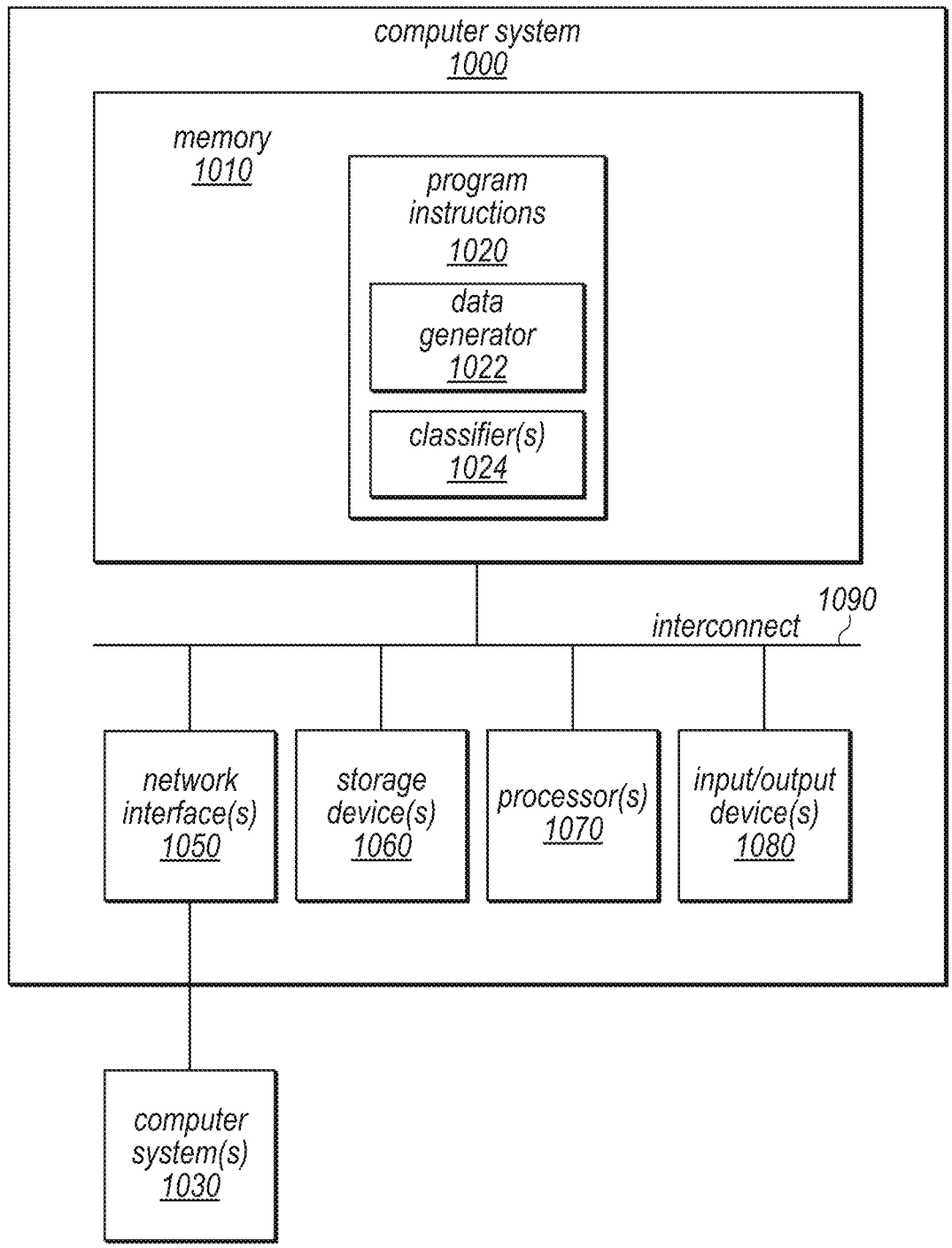
FIG. 8 illustrates an example computing system, in some embodiments.

FIG. 8 illustrates a computing system configured to implement the methods and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing a Bayesian test of demographic parity for learning to rank, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement various features described above, including a control system 1022 and post-processing 1024 that may perform the various features as discussed above with regard to FIGS. 1-2, in some embodiments as described herein. Program instructions 1020 may be encoded in platform native binary, any interpreted language such as Java™ byte-code, or in any other language such as C/C++, Java™, etc. or in any combination thereof. System memories 1010 may also contain LRU queue(s) 1026 upon which concurrent remove and add-to-front operations may be performed, in some embodiments.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A system, comprising:
   at least one processor;
   a memory comprising program instructions that when executed by the at least one processor cause the at least one processor to implement a control system configured to:
   receive a ranking of a plurality of items, wherein individual ones of the plurality of items comprise a feature that further comprises an amount of bias;
   identify that a likelihood of bias for the ranking of the plurality of items exceeds a modification criterion, and responsive to the identifying:
   modify the ranking of the plurality of items according to the modification criterion, wherein respective orders in the ranking for respective individual ones of the plurality of items sharing same values for the feature are preserved in the modification; and
   output the modified ranking of the plurality of items.

2. The system of claim 1, wherein the likelihood of bias for the ranking is determined with respect to the feature.

3. The system of claim 1, wherein the ranking of the plurality of items is received from a ranking classifier trained using machine learning.

4. The system of claim 1, wherein to receive the ranking of the plurality of items, the control system is configured to perform said apply, identify and modify steps to a previously received ranking of the plurality of items.

5. The system of claim 1, wherein the control system is configured to apply a Bayes factor to the ranking of the plurality of items to determine the likelihood of bias for the ranking of the items.

6. The system of claim 1, wherein the Bayes factor comprises a ratio of a first metric to a second metric, wherein:
   the first metric comprises a determination of a likelihood of bias in the ranking of the plurality of items; and
   the second metric comprises determination of a likelihood of absence of bias in the ranking of the plurality of items.

7. A method for implementing a control system, comprising:
   receiving a ranking of a plurality of items, wherein individual ones of the plurality of items comprise a feature that further comprises an amount of bias;
   identifying that a likelihood of bias for the ranking of the plurality of items exceeds a modification criterion, and responsive to the identifying:

modifying, responsive to the determination, the ranking of the plurality of items according to the modification criterion, wherein respective orders in the ranking for respective individual ones of the plurality of items sharing same values for the feature are preserved in the modification; and outputting the modified ranking of the plurality of items.

8. The method of claim 7, wherein the likelihood of bias of the plurality of items for the ranking of the plurality of items is determined with respect to the feature.

9. The method of claim 7, wherein:
the feature is multi-valued;
the modification criterion comprises a threshold of demographic parity with respect to the feature; and
demographic parity with respect to the feature comprises ranking items of the plurality of items with a particular value of the feature proportional to a rate of occurrence of the particular value of the feature relative to all values of the feature.

10. The method of claim 7, wherein the ranking of the plurality of items is received from a ranking classifier trained using machine learning.

11. The method of claim 7, wherein the receiving of the ranking of the plurality of items comprises performing said applying, identifying and modifying steps to a previously received ranking of the plurality of items.

12. The method of claim 7, further comprising applying a Bayes factor to the ranking of the plurality of items to determine the likelihood of bias for the ranking of the items.

13. The method of claim 7, wherein the B ayes factor comprises a ratio of a first metric to a second metric, wherein:
the first metric comprises a determination of a likelihood of bias of the plurality of items; and
the second metric comprises determination of a likelihood of absence of bias for the ranking.

14. One or more non-transitory computer-accessible storage media storing program instructions that when executed on or across one or more processors cause the one or more processors to implement a control system to enforce fairness, comprising:
receiving a ranking of a plurality of items, wherein individual ones of the plurality of items comprise a feature that further comprises an amount of bias, and wherein the feature is multi-valued;

identifying that a likelihood of bias for the ranking of the plurality of items exceeds a modification criterion, and responsive to the identifying:
modifying, responsive to the determination, the ranking of the plurality of items according to the modification criterion, wherein respective orders in the ranking for respective individual ones of the plurality of items sharing same values for the feature are preserved in the modification; and
outputting the modified ranking of the plurality of items.

15. The one or more non-transitory computer-accessible storage media of claim 14, wherein the likelihood of bias of the plurality of items for the ranking of the plurality of items is determined with respect to the feature.

16. The one or more non-transitory computer-accessible storage media of claim 14, wherein:
the modification criterion comprises a threshold of demographic parity with respect to the feature; and
demographic parity with respect to the feature comprises ranking items of the plurality of items with a particular value of the feature proportional to a rate of occurrence of the particular value of the feature relative to all values of the feature.

17. The one or more non-transitory computer-accessible storage media of claim 14, wherein the ranking of the plurality of items is received from a ranking classifier trained using machine learning.

18. The one or more non-transitory computer-accessible storage media of claim 14, wherein the receiving of the ranking of the plurality of items comprises performing the applying, identifying and modifying steps to a previously received ranking of the plurality of items.

19. The one or more non-transitory computer-accessible storage media of claim 14, further comprising applying a Bayes factor to the ranking of the plurality of items to determine the likelihood of bias for the ranking of the items.

20. The one or more non-transitory computer-accessible storage media of claim 14, wherein the Bayes factor comprises a ratio of a first metric to a second metric, wherein:
the first metric comprises a determination of unfairness of the ranking; and
the second metric comprises a determination of fairness of the ranking.

* * * * *

UNITED STATES PATENT AND TRADEMARK OFFICE
CERTIFICATE OF CORRECTION

PATENT NO. : 11,948,102 B2
APPLICATION NO. : 17/819611
DATED : April 2, 2024
INVENTOR(S) : Tristan et al.

It is certified that error appears in the above-identified patent and that said Letters Patent is hereby corrected as shown below:

On the Title Page

On page 2, Column 1, item (56) under Other Publications, Line 13, delete "(im)possiblity" and insert -- (im)possibility --, therefor.

On page 3, Column 2, item (56) under Other Publications, Line 1, delete "Serch" and insert -- Search --, therefor.

In the Specification

In Column 1, Line 53, delete "FIG." and insert -- FIGS. --, therefor.

In Column 1, Line 56, delete "FIG." and insert -- FIGS. --, therefor.

In Column 1, Line 59, delete "FIG." and insert -- FIGS. --, therefor.

In Column 1, Line 62, delete "FIG." and insert -- FIGS. --, therefor.

In Column 1, Line 65, delete "FIG." and insert -- FIGS. --, therefor.

In Column 3, Line 15, delete "tools tools" and insert -- tools --, therefor.

In Column 4, Line 31, delete "an" and insert -- and --, therefor.

In Column 7, Line 55, delete "$\mathcal{P}_i, g_i, \alpha_i, \beta_i)$" and insert -- $(\mathcal{P}_i, g_i, \alpha_i, \beta_i)$ --, therefor.

In Column 8, Line 25, after "regarding" delete "the".

In Column 8, Line 42, delete "Y" and insert -- $\overline{Y}$ --, therefor.

Signed and Sealed this
Thirteenth Day of August, 2024

*Katherine Kelly Vidal*
*Director of the United States Patent and Trademark Office*

CERTIFICATE OF CORRECTION (continued)
U.S. Pat. No. 11,948,102 B2

In Column 8, Line 47, delete "))" and insert -- ) --, therefor.

In Column 8, Line 63, delete "($\bar{Y}$)" and insert -- ($Y_i$) --, therefor.

In Column 10, Line 16, after "test" delete "is".

In Column 12, Line 34, delete "α1)." and insert -- αi). --, therefor.

In Column 13, Line 18, delete "$r_j$}" and insert -- $r_{j-1}$} --, therefor.

In Column 13, Line 62, delete "E" and insert -- $\in$ --, therefor.

In Column 14, Line 24, delete "$\in_1 : \in_{1max}$," and insert -- $\epsilon_1 : \epsilon_{1max}$ --, therefor.

In Column 14, Line 39, delete "$r_j^k$" and insert -- $r_j^K$ --, therefor.

In Column 14, Line 47, delete "$\Sigma_{p=1}^k r_j^K \pi p$." and insert -- $\sum_{p=1}^{K} r_j^K \pi_p$. --, therefor.